United States Patent
Shimizu

(10) Patent No.: US 8,994,788 B2
(45) Date of Patent: Mar. 31, 2015

(54) IMAGE CODING APPARATUS, METHOD, PROGRAM, AND CIRCUIT USING BLURRED IMAGES BASED ON DISPARITY

(75) Inventor: Kenji Shimizu, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 392 days.

(21) Appl. No.: 13/386,069

(22) PCT Filed: Mar. 30, 2011

(86) PCT No.: PCT/JP2011/001926
§ 371 (c)(1),
(2), (4) Date: Jan. 20, 2012

(87) PCT Pub. No.: WO2011/148556
PCT Pub. Date: Dec. 1, 2011

(65) Prior Publication Data
US 2012/0120193 A1    May 17, 2012

(30) Foreign Application Priority Data

May 25, 2010   (JP) .................................. 2010-119908

(51) Int. Cl.
*H04N 13/00* (2006.01)
*H04N 19/46* (2014.01)
*H04N 19/597* (2014.01)

(52) U.S. Cl.
CPC ............ *H04N 19/46* (2014.11); *H04N 13/0022* (2013.01); *H04N 13/0033* (2013.01); *H04N 13/0048* (2013.01); *H04N 19/597* (2014.11)
USPC ......................................................... 348/43

(58) Field of Classification Search
CPC .................... H04N 13/0022; H04N 19/00545; H04N 19/00769; H04N 13/0048; H04N 13/0033; H04N 19/46; H04N 19/597
USPC .......................................................... 348/43
See application file for complete search history.

(56) References Cited

U.S. PATENT DOCUMENTS

| | | | |
|---|---|---|---|
| 6,028,608 A * | 2/2000 | Jenkins | 345/619 |
| 6,900,841 B1 * | 5/2005 | Mihara | 348/345 |

(Continued)

FOREIGN PATENT DOCUMENTS

| | | |
|---|---|---|
| CN | 101199210 A | 6/2008 |
| JP | 6-284449 | 10/1994 |

(Continued)

OTHER PUBLICATIONS

International Search Report issued Jun. 21, 2011 in International (PCT) Application No. PCT/JP2011/001926.

(Continued)

*Primary Examiner* — Richard Torrente
*Assistant Examiner* — Joseph Suh
(74) *Attorney, Agent, or Firm* — Wenderoth, Lind & Ponack, L.L.P.

(57) ABSTRACT

An image coding apparatus reduces fatigue of a viewer which is caused by three-dimensional viewing and prevents a blurring process on a significant area due to an image capturing method. The image coding apparatus includes a method determining unit which determines a method of capturing two images; a disparity detection unit which detects, for each of blocks making up the respective two images, a disparity between the two images; an adjustment unit which determines, for each of the blocks, an adjustment amount for blurring an image, based on the determined image capturing method and the disparity detected for the block; and a coding unit which codes, for each of the blocks, the two images so that an image of the block is blurred by the adjustment amount determined for the block.

13 Claims, 22 Drawing Sheets

(56) References Cited

U.S. PATENT DOCUMENTS

| | | | |
|---|---|---|---|
| 2002/0009137 A1* | 1/2002 | Nelson et al. | 375/240.1 |
| 2002/0018597 A1* | 2/2002 | Kajiwara et al. | 382/233 |
| 2002/0044693 A1* | 4/2002 | Ogawa | 382/236 |
| 2002/0109701 A1* | 8/2002 | Deering | 345/581 |
| 2003/0118242 A1* | 6/2003 | Nakayama et al. | 382/245 |
| 2003/0151689 A1* | 8/2003 | Murphy | 348/362 |
| 2004/0036687 A1* | 2/2004 | Nakamura et al. | 345/422 |
| 2004/0150728 A1* | 8/2004 | Ogino | 348/239 |
| 2004/0258308 A1* | 12/2004 | Sadovsky et al. | 382/190 |
| 2005/0017968 A1* | 1/2005 | Wurmlin et al. | 345/419 |
| 2006/0210146 A1* | 9/2006 | Gu | 382/154 |
| 2008/0043095 A1* | 2/2008 | Vetro et al. | 348/51 |
| 2008/0137983 A1* | 6/2008 | Shimano et al. | 382/266 |
| 2008/0198920 A1* | 8/2008 | Yang et al. | 375/240.01 |
| 2008/0199046 A1* | 8/2008 | Sasagawa et al. | 382/106 |
| 2008/0247462 A1* | 10/2008 | Demos | 375/240.03 |
| 2008/0292197 A1* | 11/2008 | Nakagawa et al. | 382/238 |
| 2009/0002501 A1* | 1/2009 | Silsby et al. | 348/208.16 |
| 2009/0016642 A1* | 1/2009 | Hart | 382/278 |
| 2009/0033756 A1* | 2/2009 | Kamatani et al. | 348/222.1 |
| 2009/0110141 A1* | 4/2009 | Stayman | 378/19 |
| 2009/0128622 A1 | 5/2009 | Uchiumi et al. | |
| 2009/0129644 A1* | 5/2009 | Daw et al. | 382/128 |
| 2009/0207238 A1* | 8/2009 | Kim et al. | 348/51 |
| 2009/0284584 A1* | 11/2009 | Wakabayashi et al. | 348/44 |
| 2010/0002073 A1* | 1/2010 | Robinson et al. | 348/42 |
| 2010/0033617 A1* | 2/2010 | Forutanpour | 348/345 |
| 2010/0039428 A1* | 2/2010 | Kim et al. | 345/419 |
| 2010/0103311 A1* | 4/2010 | Makii | 348/369 |
| 2010/0289877 A1* | 11/2010 | Lanfranchi et al. | 348/46 |
| 2011/0157328 A1* | 6/2011 | Ishiyama et al. | 348/51 |
| 2011/0304689 A1* | 12/2011 | Sezan et al. | 348/43 |
| 2012/0127267 A1* | 5/2012 | Zhang et al. | 348/43 |
| 2013/0147843 A1* | 6/2013 | Shimizu | 345/647 |

FOREIGN PATENT DOCUMENTS

| | | |
|---|---|---|
| JP | 9-181966 | 7/1997 |
| JP | 2007-124278 | 5/2007 |
| JP | 2010-114577 | 5/2010 |

OTHER PUBLICATIONS

T. Honda, "3-D Display Technologies—New Trends of Space Expression—", CMC Publishing Co., Ltd., Jul. 31, 2008, pp. 61-62, with partial English translation.

Chinese Office Action issued Jun. 4, 2014 in corresponding Application No. 201180002954.0.

* cited by examiner

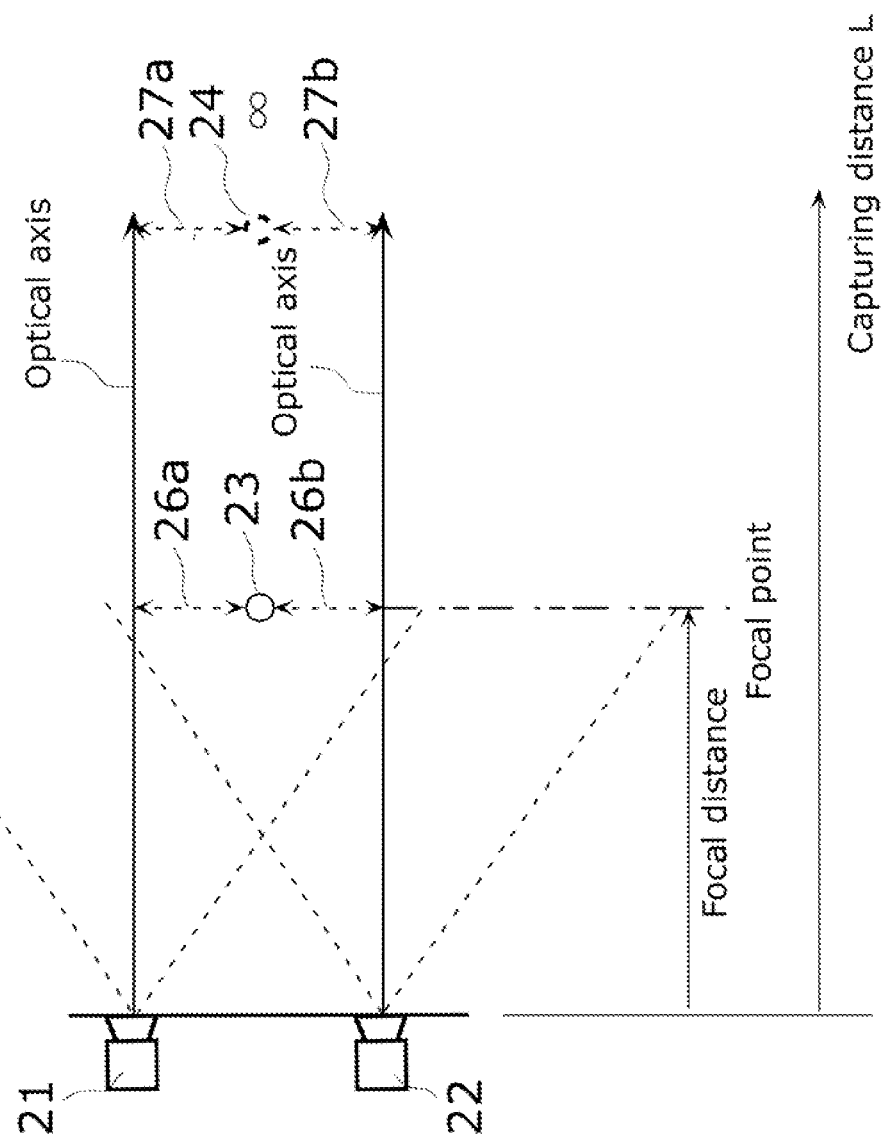

IMAGE CODING APPARATUS, METHOD, PROGRAM, AND CIRCUIT USING BLURRED IMAGES BASED ON DISPARITY

BACKGROUND OF INVENTION

1. Technical Field

The present invention relates to image coding apparatuses which perform compression coding on three-dimensional video signals, and in particular to an image coding apparatus which codes stereo images, and which is provided for an image transmission apparatus or an image recording apparatus such as a digital video camera and a digital still camera which handles two video signals indicating disparity, that is, a stereo video signal.

2. Background Art

When three-dimensional video signals are displayed on a screen that is larger than a screen assumed at the time of capturing, a distance between right and left images seen more distantly than a surface of the screen becomes greater than a distance between eyes of a viewer. In this case, the viewer attempts to maintain binocular fusion to three-dimensionally view the image, which makes eye muscle and a brain of the viewer very tired. In addition, when the distance (gap) further becomes greater, there is a problem that the viewer cannot maintain the binocular fusion, and the three-dimensional viewing fails. In order to prevent the problem, a process of blurring a long-distance view is conventionally performed so that the viewer avoids paying attention to the long-distance view (see NPL 1, for instance).

In addition, it is considered that the process of blurring a long-distance view is performed at the time of coding.

A conventional image coding apparatus which codes a three-dimensional video signal (stereo video signal) controls a degree of quantization according to disparity indicated by the stereo video signal, to control an amount of code. In other words, when the disparity is small, a degree of significance of an area having the disparity is high, and thus the image, coding apparatus increases an amount of information of the area, and when the disparity is large, the image coding apparatus decreases an amount of information of an area having the disparity, and performs a process of blurring an image in the area accordingly (see PTL 1, for example).

FIG. 1 is a block diagram showing a configuration of the conventional image coding apparatus described in PTL 1.

As shown in FIG. 1, video signals from two cameras are respectively input to processing circuits 101 and 102, and thus RGB component signals are obtained. After being converted by corresponding AD conversion units 103 and 104 into digital data sequences, the RGB component signals are accumulated in corresponding memories 105 and 106. It is to be noted that each of the memories 105 and 106 is a memory which is capable of storing digital data sequences for eight lines. The digital data sequence for eight lines, that is, data of an area (block) including 8×8 pixels on a screen is read from each of the memories 105 and 106. Subsequent processing is performed on a block-by-block basis (for each of blocks).

The data of the block accumulated in the memory 105 is input to a DCT circuit 107. The DCT circuit 107 transforms, by performing discrete cosine transform, the data into a coefficient block including real data in a frequency domain. Then, the coefficient block is input to a quantization circuit 108. The coefficient block is multiplied by a reciprocal of a predetermined quantization step, to be an integer. The quantization step is determined through the use of human visual performance, and is set so that less distortion is allowed on a lower frequency side, and much distortion is allowed on a higher frequency side. To put it differently, a quantization step for a coefficient on a low frequency side is set to be small, and a large amount of code is assigned to the low frequency side.

Then, a zero pack circuit 109 performs run-length coding on the data thus quantized. Stated differently, the zero pack circuit 109 counts the number of consecutive zeros, and codes the quantized data by pairing the number of the consecutive zeros and a coefficient which breaks the consecutive zeros.

Here, the image coding apparatus described in PTL 1 includes: a subtractor 110 which performs, for each pixel, a subtraction process between data of blocks stored in the respective memories 105 and 106; and an absolute value sum circuit 111 which calculates a sum (disparity signal) of absolute values obtained from the result of the subtraction process performed by the subtractor 110. The absolute value sum of differences between the data for the respective pixels, which is obtained in the absolute value sum circuit 111, corresponds to a displacement of an image represented by the block, that is, a disparity.

The quantization circuit 108 adjusts the quantization step according to a disparity signal output from the absolute value sum circuit 111.

A Huffman coding unit 112 performs Huffman coding, one of types of entropy coding, on the run-length coded data which is output from the zero pack circuit 109.

As stated above, the image coding apparatus described in PTL 1 increases, for the block having the large disparity, the quantization step to increase a data compression ratio of the block, and accordingly improves coding efficiency and performs the blurring process.

The following describes image capturing methods for cameras.

FIG. 2A is a diagram showing an image capturing method used by two cameras.

Cameras 21 and 22 capture an object 23 with optical axes of the respective cameras 21 and 22 crossing. Such an image capturing method is called a cross view method.

It is to be noted that an optical axis is an axis which is at the center of an image captured by a camera and is along a direction vertical to a surface of the image. A disparity is a difference between a position of an image (left image) of the object 23 captured by the camera 21 and a position of an image (right image) of the object 23 captured by the camera 22. A distance from each of the cameras 21 and 22 along a direction vertical to an array direction of the cameras 21 and 22 is called a capturing distance. Distances from each of the cameras 21 and 22 to an intersection point and a focal point are called an intersection point distance and a focal distance, respectively.

For instance, the object 23 is at an intersection point of the optical axis of the camera 21 and the optical axis of the camera 22, and the cameras 21 and 22 focus on the intersection point. In such a case, an intersection point distance is equal to a focal distance, an image of the object 23 is clear, and a disparity of the image is smallest. On the other hand, when a capturing distance is longer than the intersection point distance (focal distance), a disparity of an image of a distant object 24 at the capturing distance is indicated by differences 25a and 25b, and is much larger than the disparity of the object 23.

FIG. 2B is a graph showing a relationship between capturing distance and disparity in the cross view method.

As shown in FIG. 2B, when a capturing distance L is between 0 and an intersection point distance L1, a disparity D of an image of an object at the capturing distance L decreases as a positive value with an increase in the capturing distance L. Moreover, the disparity D becomes 0 at the intersection point distance. Furthermore, when the capturing distance L is longer than the intersection point distance L1, the disparity D decreases as a negative value with an increase in the capturing distance L. In other words, in this case, the disparity D is the negative value, and an absolute value of the disparity D increases with an increase in the capturing distance L.

As above, when the object 23 is at the intersection point (focal point), the image of the object 23 has no disparity. The image of the distant object 24 at a position farther away from the cameras 21 and 22 than the intersection point has the disparity which increases in a negative direction. In this case, although the viewer can three-dimensionally view the image of the object 23 easily, when attempting to three-dimensionally view the image of the distant object 24, the viewer needs to keep lines of sight of both eyes apart from one another. As a result, this makes the both eyes tired.

In response, the image coding apparatus described in PTL 1 determines, as a magnitude of disparity, a difference in image between one of blocks and the other of the blocks, and blurs an image of a block having a large disparity among the blocks, by increasing a quantization step for the block having the large disparity. In other words, the image coding apparatus described in PTL 1 decreases an amount of information in an area having a large disparity due to a low degree of significance of the area, and increases an amount of information in an area having a small disparity due to a high degree of significance of the area.

CITATION LIST

Patent Literature

[PTL 1]
Japanese Unexamined Patent Application Publication No. 6-284449

NPL

[NPL 1]
Honda, Toshio, ed. Rittai Eizo Gijyutsu-Kukan Hyougen Media No Saishin Doukou-. Tokyo: CMC Publishing CO., LTD., 31 Jul. 2008. 61-62.

SUMMARY OF INVENTION

However, there is a problem that the image coding apparatus described in PLT 1 may perform the blurring process on a significant area.

To put it differently, as stated above, the image coding apparatus described in PTL 1 decreases the amount of information in the area having the large disparity due to the low degree of significance of the area, and increases the amount of information in the area having the small disparity due to the high degree of significance of the area. Such a coding technique performed by the image coding apparatus can be applied not to other image capturing methods but only to the cross view method shown in FIG. 2A.

FIG. 3A is a diagram showing an other image capturing method used by two cameras.

The cameras 21 and 22 capture the object 23 with optical axes of the respective cameras 21 and 22 being parallel to each other. Such an image capturing method is called a parallel view method. For instance, the cameras 21 and 22 focus on the object 23. In such a case, an image of the object 23 is clear. A disparity of the image of the object 23 is indicated by differences 26a and 26b, and a disparity of an image of the distant object 24 at a position where the capturing distance L of the object 24 is longer than that of the object 23 is indicated by differences 27a and 27b.

FIG. 3B is a graph showing a relationship between capturing distance and disparity in the parallel view method.

As shown in FIG. 3B, a disparity D of an image of an object at the capturing distance L is always a positive value, and decreases to approach 0 with an increase in the capturing distance L.

In other words, unlike the cross view method, in the parallel view method, even when the object 23 is focused on, the image of the object 23 has the disparity. Furthermore, the disparity of the image of the distant object 24 at a position farther away from the cameras 21 and 22 than the focal point is smaller than that of the image of the object 23. Stated differently, in images obtained by the cameras 21 and 22, an area which is focused and has a high degree of significance has a relatively large disparity, and a non-focus area (long-distance view) having a low degree of significance has a small disparity close to 0.

Therefore, when the image coding apparatus described in PTL 1 codes video signals from the cameras 21 and 22 which are obtained by capturing using the parallel view method, the image coding apparatus assigns a small amount of information to the area having the large disparity, and a large amount of information to the area having the small disparity, and thus there is a possibility that the image coding apparatus performs the blurring process on the image of the focus significant block (area). As above, a disparity distribution differs depending on the image capturing method, and there is no guarantee that the smaller the disparity of the area is, the higher the degree of significance of the area is.

The present invention has been conceived in view of the problems, and an object of the present invention is to provide an image coding apparatus which is capable of reducing fatigue of a viewer which is caused by three-dimensional viewing, and of preventing a blurring process from being performed on a significant area due to an image capturing method.

In order to achieve the above object, an image coding apparatus according to one aspect of the present invention is an image coding apparatus which codes two images for three-dimensional viewing, and includes: a method determining unit configured to determine a method of capturing the two images by a camera; a disparity detection unit configured to detect, for each of areas making up the respective two images, a disparity between the two images; an adjustment unit configured to determine, for each of the areas, an adjustment amount for blurring an image, based on the image capturing method determined by the method determining unit and the disparity detected by the disparity detection unit for the area; and a coding unit configured to code, for each of the areas, the two images so that an image of the area is blurred by the adjustment amount determined for the area.

With this configuration, the adjustment amount is determined based not only on the disparity but also on the image capturing method at the time of coding the two images (e.g. main image and sub image) for the three-dimensional viewing, and the two images are coded so that the image is blurred by the adjustment amount. Blurring the image as above makes it possible to reduce fatigue of a viewer which is caused by the three-dimensional viewing. Furthermore, the adjustment amount is determined based not only on the disparity but also on the image capturing method, and thus it is possible to prevent a blurring process from being performed on a significant area due to the image capturing method.

Moreover, the method determining unit may determine whether the image capturing method is a parallel view method or a cross view method, and the adjustment unit may determine the adjustment amount for an area for which a disparity detected by the disparity detection unit is greater than a first threshold, when the method determining unit determines that the image capturing method is the cross view method.

A disparity of an area in which a long-distance view is shown is relatively large when the image capturing method is the cross view method, and thus determining the adjustment amount for the area having the disparity greater than the first threshold allows the distant image having the large disparity to be properly blurred. As a result, it is possible to reduce the fatigue of the viewer which is caused by the three-dimensional viewing. Furthermore, a disparity of an area in which an object at an intersection point of optical axes which is closer than the long-distance view is shown, that is, the significant area is extremely small when the image capturing method is the cross view method, and an adjustment amount is not determined for the area having the small disparity. Consequently, it is possible to prevent the blurring process from being performed on the significant area.

Moreover, the adjustment unit may determine the adjustment amount such that the greater the disparity, the greater a degree of blur.

With this configuration, an image having a larger disparity is blurred more strongly, and thus it is possible to properly reduce the fatigue of the viewer.

Moreover, the image coding apparatus further includes a focal point determining unit configured to determine a focus area of each of the two images captured by the camera, wherein the adjustment unit may set, as the first threshold, a magnitude of the disparity detected by the disparity detection unit for each of the areas determined by the focal point determining unit.

With this configuration, a disparity of an area that is focused (what is called focus area) is set as the first threshold, and an adjustment amount is determined for the area having the disparity greater than the first threshold. Thus, it is possible to blur the distant image while clarifying the focus area, that is, enhancing the image quality of the focus area.

Moreover, the method determining unit may determine whether the image capturing method is a parallel view method or a cross view method, and the adjustment unit may determine the adjustment amount for an area for which a disparity detected by the disparity detection unit is less than a second threshold, when the method determining unit determines that the image capturing method is the parallel view method.

The disparity of the area in which the long-distance view is shown is relatively small when the image capturing method is the parallel view method, and thus determining the adjustment amount for the area having the disparity less than the second threshold allows the distant image having the small disparity to be properly blurred. Furthermore, the disparity of the area in which the object closer than the long-distance view is shown, that is, the significant area is relatively large when the image capturing method is the cross view method, and the adjustment amount is not determined for the area having the large disparity. As a result, it is possible to prevent the blurring process from being performed on the significant area.

Moreover, the adjustment unit may determine the adjustment amount such that the less the disparity, the greater a degree of blur.

With this configuration, an image having a smaller disparity is blurred more strongly, and thus it is possible to properly blur the distant image.

Moreover, the image coding apparatus further includes a focal point determining unit configured to determine a focus area of each of the two images captured by the camera, wherein the adjustment unit may set, as the second threshold, a magnitude of the disparity detected by the disparity detection unit for each of the areas determined by the focal point determining unit.

With this configuration, a disparity of an area that is focused (what is called focus area) is set as the second threshold, and an adjustment amount is determined for the area having the disparity less than the second threshold. Thus, it is possible to blur the distant image while clarifying the focus area, that is, enhancing the image quality of the focus area.

Moreover, the method determining unit may (i) determine, as an angle of convergence, an angle at which two optical axes of the camera for generating the two images intersect with each other, (ii) determine whether or not the angle of convergence is less than a predetermined angle, (iii) determine that the image capturing method is a cross view method, when it is determined that the angle of convergence is not less than the predetermined angle, and (iv) determine that the image capturing method is a parallel view method, when it is determined that the angle of convergence is less than the predetermined angle.

With this configuration, the angle of convergence is determined, and it is determined whether the image capturing method is the parallel view method or the cross view method based on the angle of convergence. Consequently, it is possible to properly determine the image capturing method.

Moreover, the disparity detection unit may detect, for each of the areas, the disparity between the two images as a disparity vector, and the method determining unit may (i) determine whether or not a disparity vector having a negative direction and a disparity vector having a positive direction coexist in a distribution of the disparity vectors detected by said disparity detection unit for the areas, (ii) determine that the image capturing method is a cross view method, when it is determined that the disparity vector having the negative direction and the disparity having the positive direction coexist, and (iii) determine that the image capturing method is a parallel view method, when it is determined that the disparity vector having the negative direction and the disparity having the positive direction do not coexist.

With this configuration, it is determined whether the image capturing method is the parallel view method or the cross view method according to a disparity vector distribution. Thus, for instance, in comparison with a case where the image capturing method is determined based on the angle of convergence, it is unnecessary to purposely determine the angle of convergence, and to simplify the configuration and processing operations of the image coding apparatus.

Moreover, the coding unit includes: a conversion unit configured to perform, for each of the areas, orthogonal transformation on each of the two images; and a quantization unit configured to quantize, for each of the areas, a frequency coefficient obtained through the orthogonal transformation performed by the conversion unit, wherein the quantization unit may increase, when a frequency coefficient of one of the areas is quantized, a quantization step by the adjustment amount determined by the adjustment unit for the area, and blur an image of the area by quantizing the frequency coefficient of the area using the increased quantization step.

With this configuration, the image is blurred using the increased quantization step, and thus it is possible to use, for the image blurring process, a parameter used for image coding, and simplify the configuration and processing operations of the image coding apparatus without adding the image blurring process or the elements.

Moreover, the coding unit includes a conversion unit configured to perform, for each of the areas, orthogonal transformation on each of the two images, and the conversion unit may perform the orthogonal transformation on one of the areas, and blur, when frequency coefficients are generated for the area, an image of the area by rounding down, among the frequency coefficients included in the area, a frequency coefficient in a high frequency domain having an extent corresponding to the adjustment amount determined by the adjustment unit for the area.

With this configuration, the image is blurred by rounding down the frequency coefficient in the high frequency domain, and thus it is possible to properly blur the image using data generated by the image coding, and simplify the configuration and processing operations of the image coding apparatus without adding the image blurring process or the elements.

Moreover, the coding unit may generate a predictive image by predicting one of the two images from the other of the two images, using the disparity detected for each of the areas, and code the one image by calculating a difference between the one image and the predictive image.

With this configuration, the so-called disparity compensation prediction coding is performed, and thus it is possible to increase coding efficiency for the two images.

Moreover, the method determining unit may determine, as the image capturing method, an angle between lines each of which shows a direction of capturing one of the two images, and the adjustment unit may determine, for each of the areas, an adjustment amount for blurring an image, based on the angle determined by said method determining unit and the disparity detected by said disparity detection unit for the area.

With this configuration, the image is blurred according to the angle between the so-called center lines of the two images and the disparity, and thus it is possible to prevent the blurring process from being performed on the significant area due to the angle.

Moreover, in order to achieve the above object, an image coding apparatus according to another aspect of the present invention is an image coding apparatus which codes two images for three-dimensional viewing, and includes: a disparity detection unit configured to detect, for each of areas making up the respective two images captured by a camera using a parallel view method, a disparity between the two images; an adjustment unit configured to determine, for each of the areas, an adjustment amount for blurring an image, based on the disparity detected by the disparity detection unit for the area; and a coding unit configured to code, for each of the areas, the two images so that an image of the area is blurred by the adjustment amount determined for the area. With this configuration, when the image capturing method is the parallel view method, it is possible to prevent the blurring process from being performed on the significant area.

It is to be noted that the present invention is realized not only as such an image coding apparatus but also as a processing operation method for the image coding apparatus, a program for causing the image coding apparatus to execute processing operations, a recording medium having the program recorded thereon, a system including the image coding apparatus, and an image decoding apparatus which decodes a signal coded by the image coding apparatus.

The image coding apparatus according to an implementation of the present invention is capable of reducing the fatigue of the viewer which is caused by the three-dimensional viewing, and of preventing the blurring process from being performed on the significant area due to the image capturing method.

BRIEF DESCRIPTION OF DRAWINGS

FIG. 3A is a diagram showing an other image capturing method used by two cameras.

DETAILED DESCRIPTION OF INVENTION

The following describes embodiments of the present invention with reference to the drawings.

(Embodiment 1)

Figure 4:
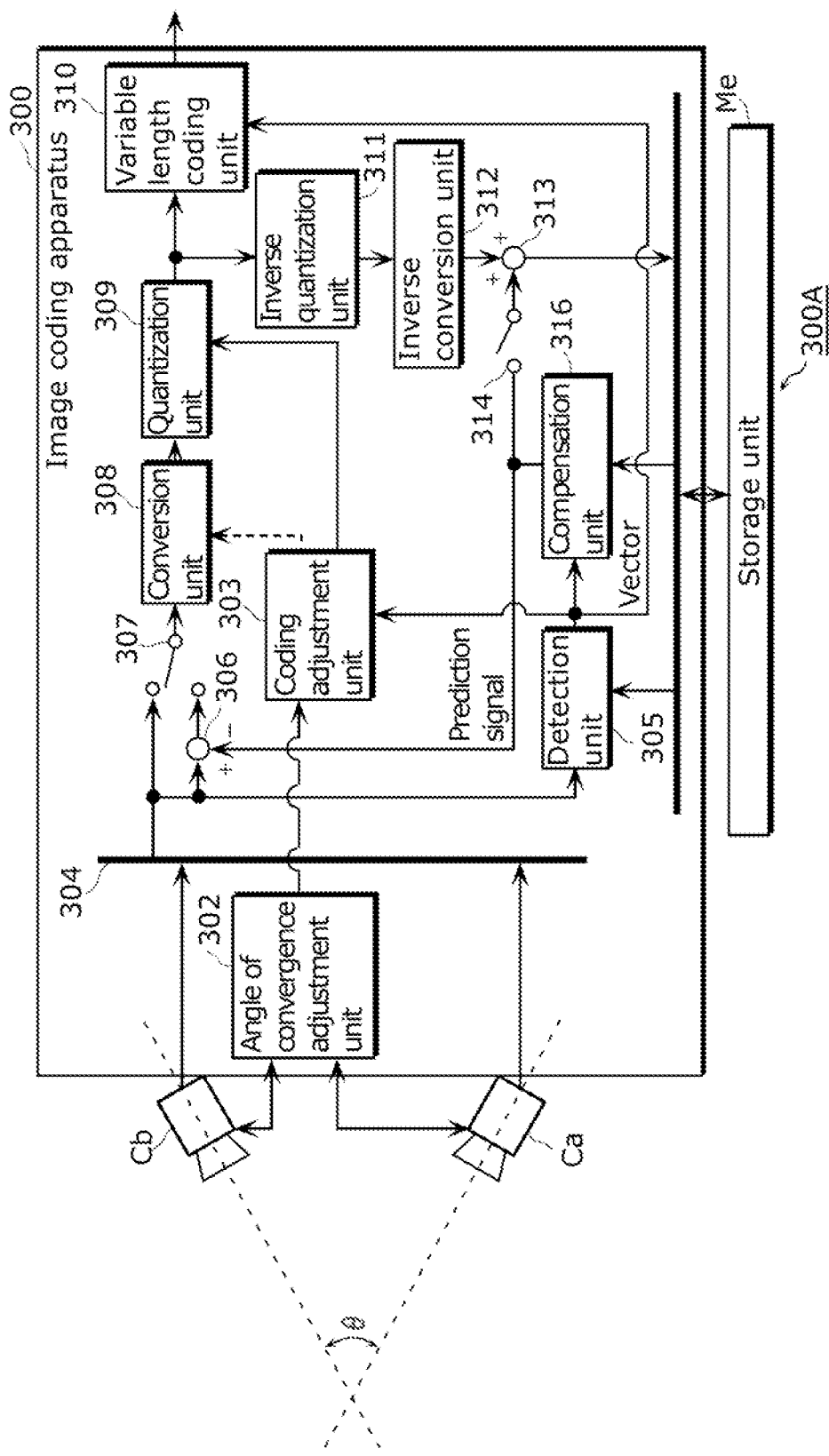
FIG. 4 is a block diagram showing a configuration of an image coding apparatus according to Embodiment 1 of the present invention.

FIG. 4 is a block diagram showing a configuration of an image coding apparatus according to Embodiment 1 of the present invention.

A stereo capturing equipment 300A captures an object for three-dimensional viewing, and codes stereo video signal generated by the capturing. Such a stereo capturing equipment 300A includes an image coding apparatus 300 according to Embodiment 1, cameras Ca and Cb, and a storage unit Me.

Figure 1:
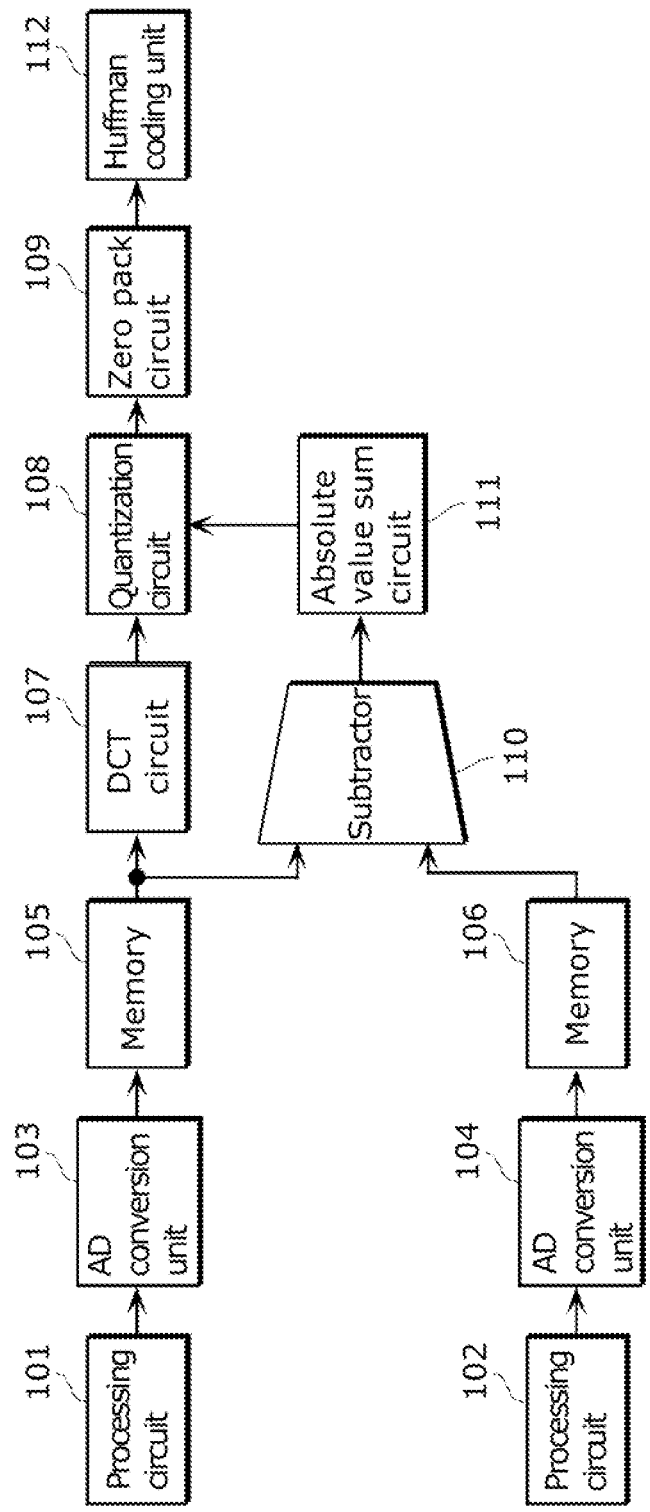
FIG. 1 is a block diagram showing a configuration of a conventional image coding apparatus.
Figure 2A:
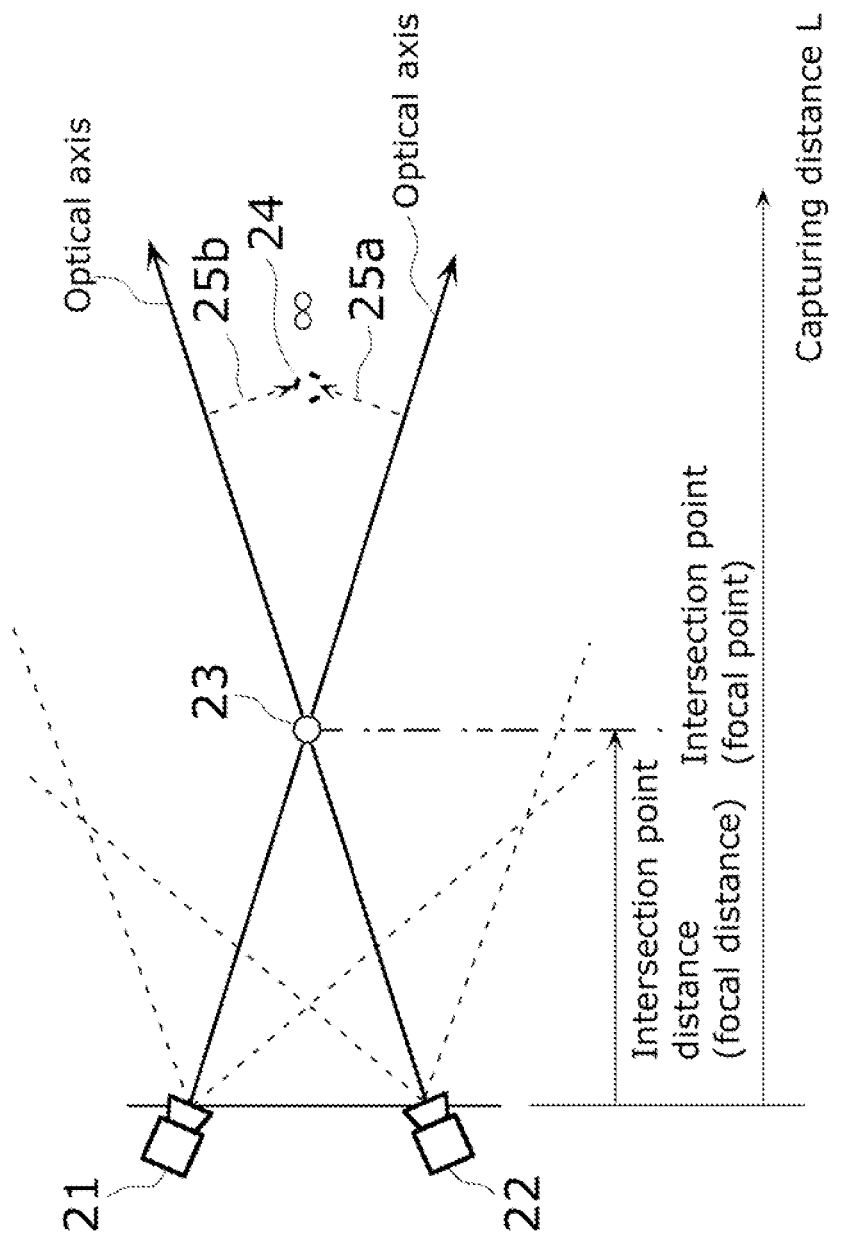
FIG. 2A is a diagram showing an image capturing method used by two cameras.
Figure 2B:
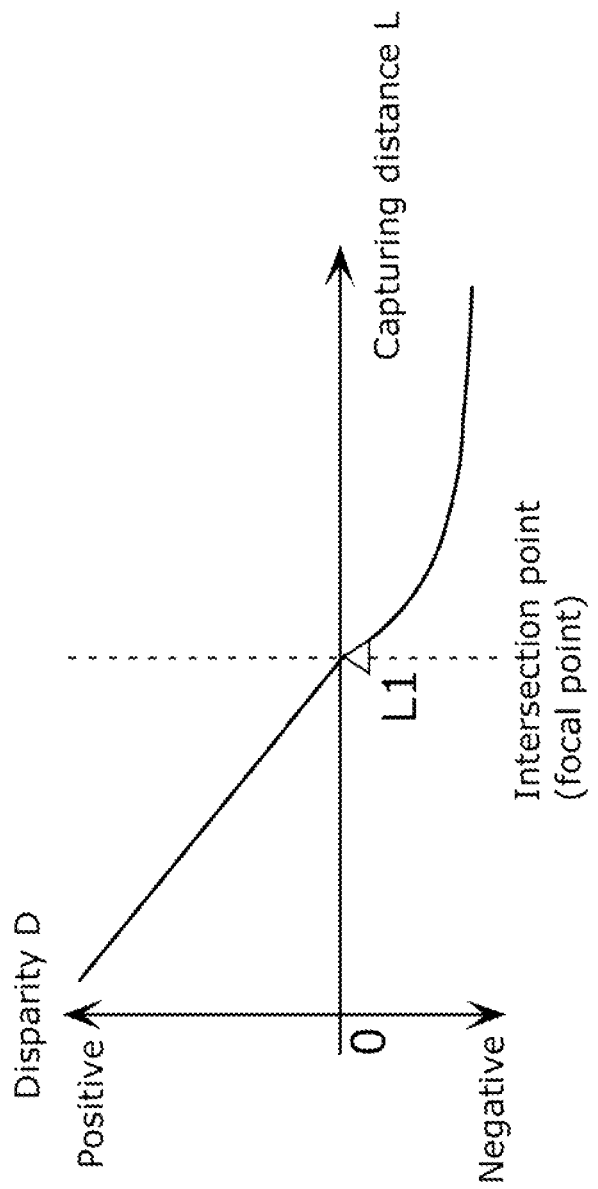
FIG. 2B is a graph showing a relationship between capturing distance and disparity in a cross view method.
Figure 3B:
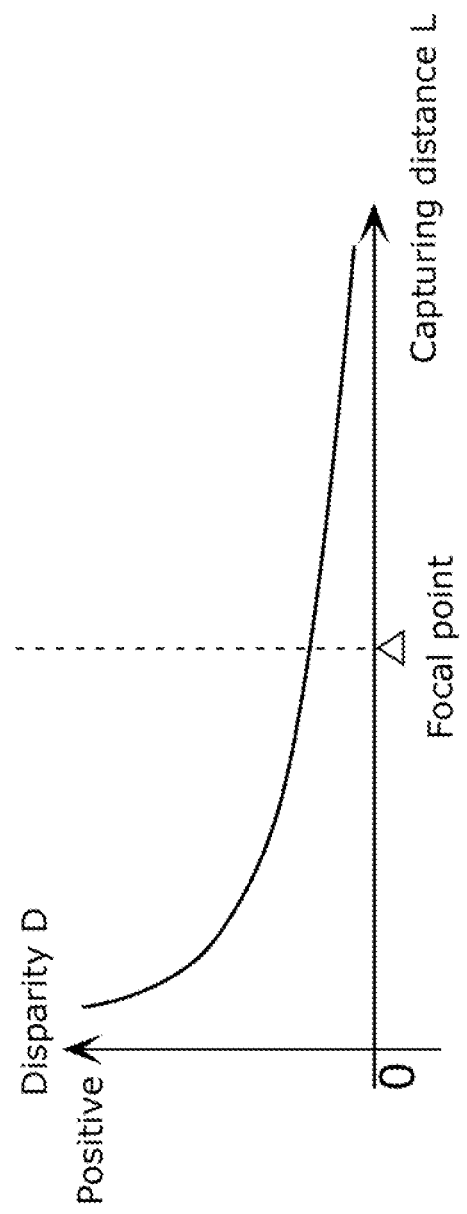
FIG. 3B is a graph showing a relationship between capturing distance and disparity in a parallel view method.

The cameras Ca and Cb are placed at a distance of, for instance, 6.5 cm (an average distance between human eyes) from each other, and each of the cameras Ca and Cb is rotatably provided around an axis along a direction vertical to a plane including the cameras Ca and Cb (e.g. a direction vertical to a plane of the paper of FIG. 1). Moreover, each of the cameras Ca and Cb captures an object, and provides, for the image coding apparatus 300, video signals obtained by the capturing. It is to be noted that the video signals provided by each of the cameras Ca and Cb are collectively called a stereo video signal. An image indicated by the video signals provided by the camera Ca is called a main image, and an image indicated by the video signals provided by the camera Cb is called a sub image. The main image and the sub image allow the image of the object to be three-dimensionally viewed. Each of the video signals includes a plurality of pictures, and each of the cameras Ca and Cb sequentially generates pictures with the substantially same timing, and provides the generated pictures.

The storage unit Me is a recording medium for storing image data (local decoded image signals) to be provided by the image coding apparatus 300.

The image coding apparatus 300 codes the stereo video signal provided by the cameras Ca and Cb, to generate a coded stereo video signal, and provides the coded stereo video signal. Moreover, when the image coding apparatus 300 codes two video signals in the stereo video signal, the image coding apparatus 300 codes the video signals for each block (area) making up a picture. Here, when the image coding apparatus 300 codes the video signal provided by the camera Ca, the image coding apparatus 300 codes respective pictures in the video signal as an I-picture, a P-picture, and a B-picture. It is to be noted that when the image coding apparatus 300 codes the P-picture and the B-picture, the image coding apparatus 300 performs inter-frame prediction coding (motion compensation prediction coding). On the other hand, when the image coding apparatus 300 codes the video signal provided by the camera Cb, the image coding apparatus 300 performs disparity compensation prediction coding to code the respective pictures in the video signal as the P-picture. In other words, the image coding apparatus 300 predicts, from a picture of a main image, a picture of a sub image generated with the same timing as the picture of the main image, and codes the picture of the sub image based on the prediction result.

Such an image coding apparatus 300 includes an angle of convergence adjustment unit 302, a coding adjustment unit 303, a selector 304, a detection unit 305, a subtractor 306, a switch 307, a conversion unit 308, a quantization unit 309, a variable length coding unit 310, an inverse quantization unit 311, an inverse conversion unit 312, an adder 313, a switch 314, and a compensation unit 316

The angle of convergence adjustment unit 302 determines an angle of convergence θ between the cameras Ca and Cb. For example, a sensor which detects an angle is attached to each of the cameras Ca and Cb. Each of the sensors detects, as the angle, a direction of a corresponding one of the cameras Ca and Cb which are rotatably adjustable. The angle of convergence adjustment unit 302 obtains the angles detected by the sensors, and determines the angle of convergence θ based on the angles.

Furthermore, the angle of convergence adjustment unit 302 determines whether an image capturing method used by the cameras Ca and Cb is a parallel view method or a cross view method, based on the angle of convergence θ, and provides the coding adjustment unit 303 with an image capturing method signal indicating the determination result. For instance, the angle of convergence adjustment unit 302 determines that the image capturing method is the parallel view method, when the angle of convergence θ is less than a predetermined angle, and determines that the image capturing method is the cross view method, when the angle of convergence θ is equal to or greater than the predetermined angle.

The selector 304 obtains the video signal provided from each of the cameras Ca and Cb, and provides, by alternately switching between the video signals, the switch 307, the subtractor 306 or the detection unit 305 with the video signal. For example, the selector 304 performs the switching on a picture-by-picture basis. In this case, when the selector 304 obtains, from each of the cameras Ca and Cb, a picture with the same timing, the selector 304 provides first the picture obtained from the camera Ca, and then the picture obtained from the camera Cb.

The subtractor 306 calculates, on a block-by-block basis, a difference between a current image to be coded which is indicated by the video signal provided from the selector 304 and a predictive image which is indicated by a prediction signal provided from the compensation unit 316. The subtractor 306 provides the switch 307 with a prediction error signal indicating the difference. Here, when the current image is an image (block) of a P-picture or a B-picture, the subtractor 306 calculates the difference and provides the prediction error signal.

When the current image is a main image of an I-picture, the switch 307 connects the selector 304 to the conversion unit 308, and transfers the video signal indicating the current image from the selector 304 to the conversion unit 308. Moreover, when the current image is the image (main image or sub image) of the P-picture or the B-picture, the switch 307 connects the subtractor 306 to the conversion unit 308, and transfers a prediction error signal of the P-picture or the B-picture from the subtractor 306 to the conversion unit 308.

The conversion unit 308 obtains, on a block-by-block basis, the video signal or the prediction error signal as an image signal via the switch 307, and performs orthogonal transformation (e.g. discrete cosine transform) on the image signal. Consequently, the conversion unit 308 converts the image signal into a frequency coefficient (DCT coefficient), that is, converts a domain of the image signal from a space domain to a frequency domain, and provides the quantization unit 309 with the frequency coefficient.

The quantization unit 309 obtains the frequency coefficient from the conversion unit 308, and quantizes the frequency coefficient. To put it differently, the quantization unit 309 divides the frequency coefficient by a quantization step, to generate a quantization value. Here, when the quantization unit 309 receives an adjustment signal from the coding adjustment unit 303, the quantization unit 309 increases the quantization step by an adjustment amount indicated by the adjustment signal. For instance, when the quantization unit 309 does not receive the adjustment signal for a current block to be coded, the quantization unit 309 performs the quantization on the current block, using a quantization step determined according to image coding standards (specifically, H.264/AVC and so on). When the quantization unit 309 receives the adjustment signal for the current block, the quantization unit 309 updates the quantization step determined according to the image coding standards so that the quantization step is increased by adding the adjustment amount to the quantization step or multiplying the quantization step by the adjustment amount. The quantization unit 309 performs the quantization on the current block, using the quantization step thus increased.

The variable length coding unit 310 performs variable length coding on the quantization value generated by the quantization unit 309 and a vector (motion vector or disparity vector) provided from the detection unit 305, to generate a coded stereo video signal, and provides the coded stereo video signal. It is to be noted that the variable length coding is reversible coding.

The inverse quantization unit 311 performs inverse quantization on the quantization value generated by the quantization unit 309, to generate an inverse-quantized frequency coefficient. Stated differently, the inverse quantization unit 311 multiplies the quantization value by the quantization step used by the quantization unit 309, to generate the inverse-quantized frequency coefficient. It is to be noted that unlike the frequency coefficient generated by the conversion unit 308, the inverse-quantized frequency coefficient that is thus generated includes a quantization error.

The inverse conversion unit 31 performs inverse orthogonal transformation (e.g. inverse discrete cosine transform) on the inverse-quantized frequency coefficient generated by the inverse quantization unit 311. As a result, the inverse conversion unit 312 converts the inverse-quantized frequency coefficient into an image signal, that is, converts a domain of the inverse-quantized frequency coefficient from the frequency domain to the space domain, and provides the adder 313 with the image signal.

When the current image is the main image of the I-picture, the adder 313 stores, as a local decoded image signal, the image signal provided from the inverse conversion unit 312, in the storage unit Me. Moreover, when the current image is the image (main image or sub image) of the P-picture or the B-picture, the adder 311 adds the image signal provided from the inverse conversion unit 312 and the prediction signal provided from the compensation unit 316 via the switch 314, and stores the addition result as the local decoded image signal in the storage unit Me.

The detection unit 305 obtains the current image from the selector 304, and detects a motion vector for the current image on a block-by-block basis when the current image is the main image of the P-picture or the B-picture. In other words, the detection unit 305 refers to, as a reference image, a local decoded image signal which is stored in the storage unit Me and indicates another main image (I-picture or P-picture) that has been coded and decoded. Next, the detection unit 305 searches the reference image for a block that is the same as or similar to the current image (current block), to detect a motion of the current image as the motion vector. Then, the detection unit 305 provides the compensation unit 316 and the variable length coding unit 310 with the motion vector.

On the other hand, when the current image obtained from the selector 304 is the sub image of the P-picture, the detection unit 305 detects a disparity vector for the current image on a block-by-block basis. In other words, the detection unit 305 refers to, as a reference image, a local decoded image signal which is stored in the storage unit Me and indicates the main image (I-picture, P-picture or B-picture) that has been coded and decoded. Next, the detection unit 305 searches the reference image for a block that is the same as or similar to the current image (current block), to detect a positional relationship between the current block and the same or similar block as the disparity vector (disparity). It is to be noted that the picture of the sub image including the current block and the reference image (reference picture) that is the main image are respective pictures generated by the cameras Ca and Cb with the same timing. Then, the detection unit 305 provides the coding adjustment unit 303, the compensation unit 316, and the variable length coding unit 310 with the disparity vector. It is to be noted that the disparity vector indicates the positional relationship between the blocks as a displacement of a horizontal position. In addition, one of the right and left directions is a positive direction, and the other of the right and left directions is a negative direction.

When the compensation unit 316 obtains the motion vector from the detection unit 305, the compensation unit 316 performs motion compensation, using the motion vector and the reference image, to generate a prediction signal, and provides the prediction signal. To put it differently, the same or similar block in the reference image is spatially shifted according to the motion vector. In contrast, when the compensation unit 316 obtains the disparity vector from the detection unit 305, the compensation unit 316 performs motion compensation, using the disparity vector and the reference image, to generate a prediction signal, and provides the prediction signal. Stated differently, the same or similar block in the reference image is spatially shifted according to the disparity vector.

When the current image is the main image of the I-picture, the switch 314 opens between the compensation unit 316 and the adder 313. On the other hand, when the current image is the image (main image or sub image) of the P-picture or the B-picture, the switch 314 connects the compensation unit 316 to the adder 313, and transfers the prediction signal from the compensation unit 316 to the adder 313.

The coding adjustment unit 303 obtains the image capturing method signal from the angle of convergence adjustment unit 302, and the disparity vector from the detection unit 305. Then, when the image capturing method signal indicates the cross view method, the coding adjustment unit 303 determines, for a block of which a disparity vector having a magnitude greater than a first threshold and a negative direction has been detected, an adjustment amount according to the magnitude of the disparity vector, and provides the quantization unit 309 with an adjustment signal indicating the adjustment amount. For example, the coding adjustment unit 303 provides an adjustment signal indicating a larger adjustment amount as the magnitude of the disparity vector becomes greater. In this case, upon obtaining the adjustment signal, the quantization unit 309 increases the quantization step by the adjustment amount indicated by the adjustment signal.

In contrast, when the image capturing method signal indicates the parallel view method, the coding adjustment unit 303 determines, for a block of which a disparity vector having a magnitude less than a second threshold and a positive direction has been detected, an adjustment amount according to the magnitude of the disparity vector, and provides the quantization unit 309 with an adjustment signal indicating the adjustment amount. For example, the coding adjustment unit 303 provides an adjustment signal indicating a larger adjustment amount as the magnitude of the disparity vector becomes less. In this case, upon obtaining the adjustment signal, the quantization unit 309 increases the quantization step by the adjustment amount indicated by the adjustment signal.

As stated above, quantizing the frequency coefficient of the block by the increased quantization step results in blurring the image of the block in comparison to an image coded according to the image coding standards. Hereafter, such a process of blurring an image is referred to as a blurring process, and the process of determining an adjustment amount is referred to as a degree of blur adjustment process.

Figure 5A:
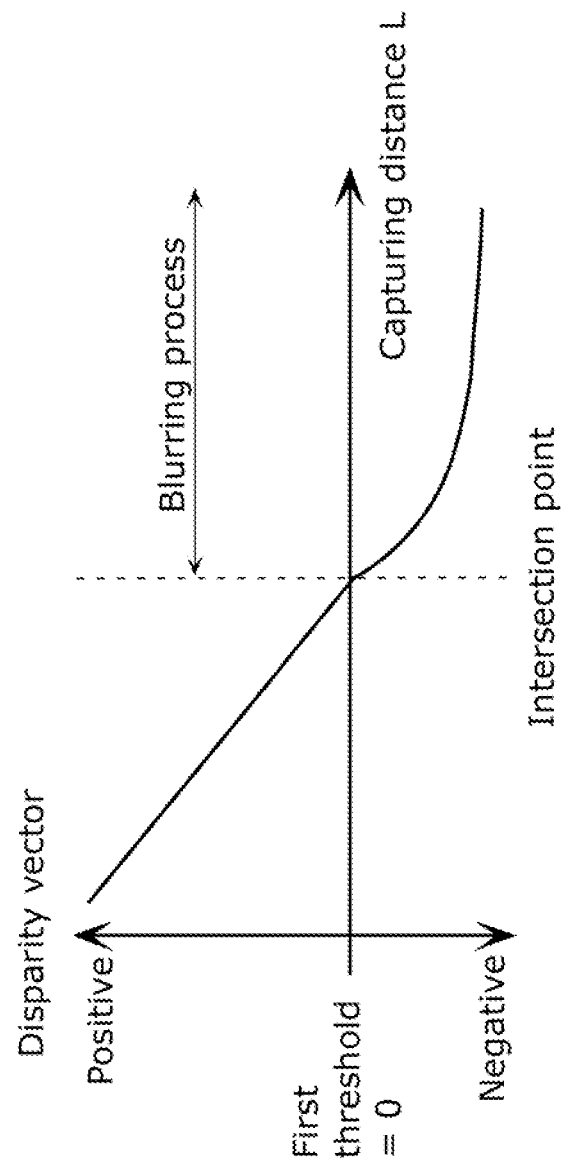
FIG. 5A is a graph showing a range within which a blurring process is performed in the cross view method according to Embodiment 1 of the present invention.

FIG. 5A is a graph showing a range within which a blurring process is performed in the cross view method.

As shown in FIG. 5A, a magnitude of a disparity vector is 0 at an intersection point of optical axes. Here, for instance, when the first threshold is 0, a direction of a disparity vector of an image of an object at a capturing distance L longer than a distance to the intersection point is negative, and a magnitude of the disparity vector is greater than 0 that is the first threshold. As a result, the image coding apparatus 300 according to this embodiment performs the blurring process on the image of the object at the capturing distance L longer than the distance to the intersection point.

Figure 5B:
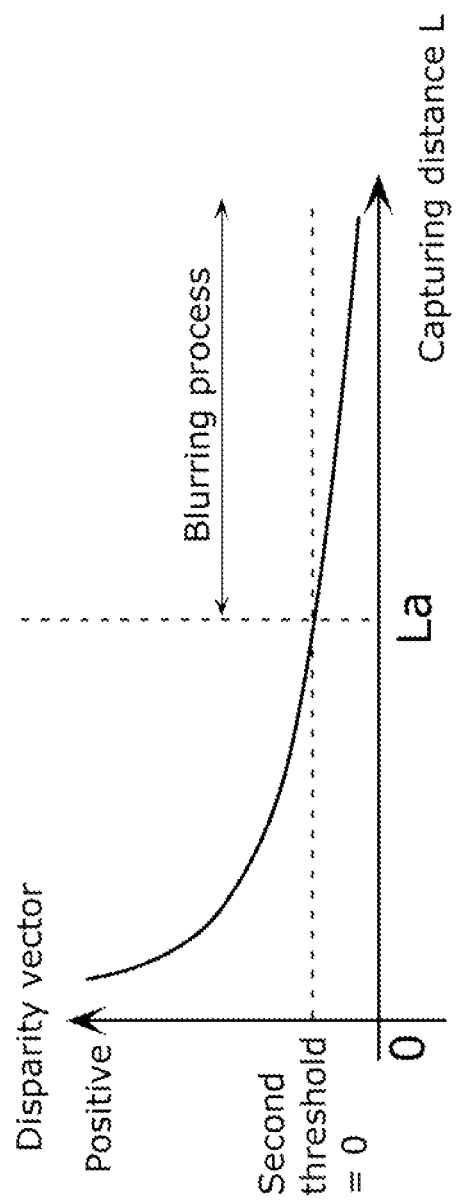
FIG. 5B is a graph showing a range within which a blurring process is performed in the parallel view method according to Embodiment 1 of the present invention.

FIG. 5B is a graph showing a range within which a blurring process is performed in the parallel view method.

As shown in FIG. 5B, for example, when the capturing distance L is a distance La, a magnitude of a disparity vector at the distance La is the second threshold. In this case, a direction of a disparity vector of an image of an object at the capturing distance L farther than the distance La is positive, and a magnitude of the disparity vector is less than the second threshold. As a result, the image coding apparatus 300 according to this embodiment performs the blurring process on the image of the object at the capturing distance L farther than the distance La.

Figure 6:
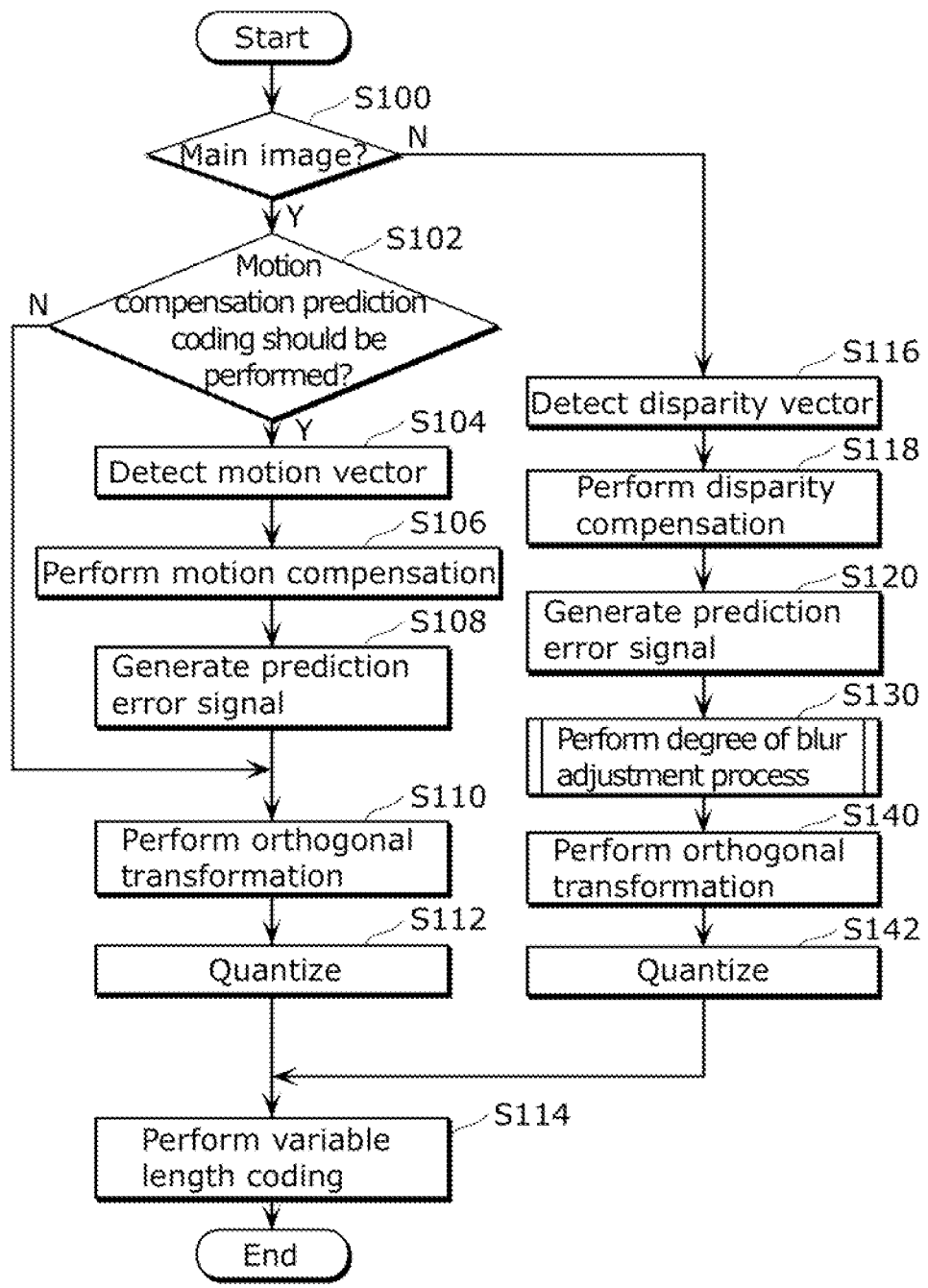
FIG. 6 is a flowchart showing operations of the image coding apparatus according to Embodiment 1 of the present invention.

FIG. 6 is a flowchart showing operations of the image coding apparatus 300 according to this embodiment.

When the image coding apparatus 300 sequentially codes a picture included in a stereo video signal, the image coding apparatus 300 codes the picture on a block-by-block basis. When the image coding apparatus 300 codes the block, the image coding apparatus 300 first determines whether or not a current image to be coded that is the block is a main image (step S100). For instance, a control unit (not shown) in the image coding apparatus 300 performs the determination.

Here, when the control unit determines that the current image is the main image (Y in step S100), the control unit further determines whether or not motion compensation prediction coding should be performed on the current image (step S102). For example, when the image coding apparatus 300 codes the current image as a block of a P-picture or a B-picture, the image coding apparatus 300 determines that the motion compensation prediction coding should be performed, and when the image coding apparatus 300 codes the current image as a block of an I-picture, the image coding apparatus 300 determines that the motion compensation prediction coding should not be performed.

When the control unit determines that the motion compensation prediction coding should be performed (Y in step S102), the control unit causes the switch 307 to connect the subtractor 306 to the conversion unit 308, and causes the switch 314 to connect the compensation unit 316 to the adder 313.

Next, the detection unit 305 detects a motion vector for the block of the current image (step S104). The compensation unit 316 performs motion compensation, using the detected motion vector, to generate a prediction signal for the block of the current image (step S106). The subtractor 306 subtracts an image indicated by the prediction signal from the current image, to generate a prediction error signal (step S108).

The conversion unit 308 performs orthogonal transformation on the prediction error signal generated in step S108, to generate a frequency coefficient (step S110). The quantization unit 309 quantizes the frequency coefficient to generate a quantization value (step S112). Then, the variable length coding unit 310 performs variable length coding on the quantization value (step S114).

On the other hand, when the control unit determines in step S102 that the motion compensation prediction coding should not be performed (N in step S102), the control unit causes the switch 307 to connect the selector 304 to the conversion unit 308, and causes the switch 314 to open between the compensation unit 316 and the adder 313. As a result, the conversion unit 308 performs the orthogonal transformation on the block of the current image provided from the selector 304, to generate a frequency coefficient (step S110). The quantization unit 309 quantizes the frequency coefficient to generate a quantization value (step S112). The variable length coding unit 310 performs the variable length coding on the quantization value (step S114).

Moreover, when the control unit determines that the current image is the sub image in step S100 (N in step S100), the control unit causes the switch 307 to connect the subtractor 306 to the conversion unit 308, and causes the switch 314 to connect the compensation unit 316 to the adder 313.

Next, the detection unit 305 detects a disparity vector for a block of the current image (step S116). The compensation unit 316 performs disparity compensation, using the detected disparity vector, to generate a prediction signal for the block of the current image (step S118). The subtractor 306 subtracts an image indicated by the prediction signal from the current image, to generate a prediction error signal (step S120).

Here, the coding adjustment unit 303 performs a degree of blur adjustment process based on the disparity vector detected in step S116 and the image capturing method signal provided from the angle of convergence adjustment unit 302 (step S130).

Subsequently, the conversion unit 308 performs the orthogonal transformation on the prediction error signal generated in step S120, to generate a frequency coefficient (step S140). Furthermore, the quantization unit 309 quantizes the frequency coefficient using a quantization step, to generate a quantization value (step S142). Here, when an adjustment amount is determined in the degree of blur adjustment process performed in step S130, the quantization unit 309 increases the quantization step according to the adjustment amount, and performs the quantization using the increased quantization step. Moreover, when the adjustment amount is not determined in the degree of blur adjustment process performed in step S130, the quantization unit 309 performs the quantization using the quantization step determined according to the image coding standards. Then, the variable length coding unit 310 performs variable length coding on the quantization value (step S142).

Figure 7:
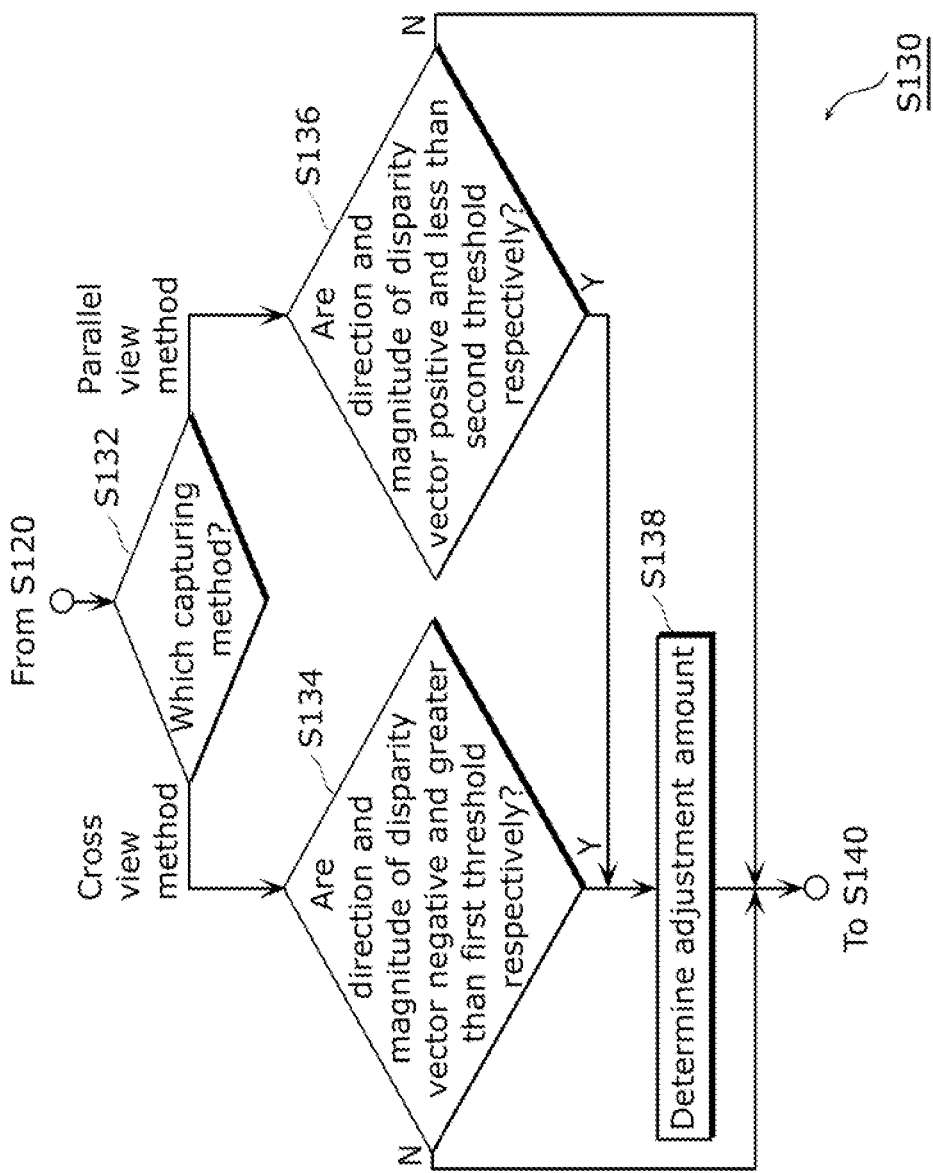
FIG. 7 is a flowchart showing details of a degree of blur adjustment process according to Embodiment 1 of the present invention.

FIG. 7 is a flowchart showing details of the degree of blur adjustment process (step S130).

The angle of convergence adjustment unit 302 determines an angle of convergence θ, and determines, based on the angle of convergence θ, whether an image capturing method used by the cameras Ca and Cb is the cross view method or the parallel view method (step S132). Here, when the angle of convergence adjustment unit 302 determines that the image capturing method is the cross view method (Cross view method in step S132), the coding adjustment unit 303 determines whether or not a direction and a magnitude of the disparity vector which the detection unit 305 has detected for the block of the current image are negative and greater than a first threshold, respectively (step S134).

Here, when the coding adjustment unit 303 determines that the direction and the magnitude of the disparity vector are negative and greater than the first threshold (Y in step S134), the coding adjustment unit 303 determines the adjustment amount for the quantization step to be used by the quantization unit 309 (step S138). For example, the coding adjustment unit 303 determines a larger adjustment amount as the magnitude of the disparity vector becomes greater.

On the other hand, when the coding adjustment unit 303 determines in step S134 that the direction of the disparity vector is not negative or the magnitude of the disparity vector is equal to or less than the first threshold (N in step S134), the coding adjustment unit 303 does not determine the adjustment amount. It is to be noted that, here, the coding adjustment unit 303 may determine an adjustment amount (e.g. 0 or 1) indicating that the quantization step does not need to be increased, and provide the quantization unit 309 with an adjustment signal indicating the adjustment amount. In this case, upon obtaining the adjustment signal, the quantization unit 309 adds the adjustment amount=0 indicated by the adjustment signal to the quantization step determined according to the image coding standards or multiplies the quantization step determined according to the image coding standards by the adjustment amount=1. As a result, the quantization unit 309 performs the quantization using the quantization step determined according to the image coding standards, without increasing the quantization step.

Moreover, when the angle of convergence adjustment unit 302 determines in step S132 that the image capturing method is the parallel view method (Parallel view method in step S132), the coding adjustment unit 303 determines whether or not a direction and a magnitude of the disparity vector which the detection unit 305 has detected for the block of the current image are positive and less than a second threshold, respectively (step S136).

Here, when the coding adjustment unit 303 determines that the direction and the magnitude of the disparity vector are positive and less than the second threshold (Y in step S136), the coding adjustment unit 303 determines, based on the magnitude of the disparity vector, the adjustment amount for the quantization step to be used by the quantization unit 309 (step S138). For example, the coding adjustment unit 303 determines a larger adjustment amount as the magnitude of the disparity vector becomes less.

On the other hand, when the coding adjustment unit 303 determines in step S136 that the direction of the disparity vector is not positive or the magnitude of the disparity vector is equal to or greater than the second threshold (N in step S136), the coding adjustment unit 303 does not determine the adjustment amount. It is to be noted that, here, similarly to the above, the coding adjustment unit 303 may determine the adjustment amount (e.g. 0 or 1) indicating that the quantization step does not need to be increased.

It is to be noted that although the blurring process is performed only on the sub image in the above explanation, the blurring process may be performed on the main image and the sub image. In this case, as stated above, after coding first the main image and then the sub image on a block-by-block basis and determining the adjustment amount for each block, the image coding apparatus 300 codes again the main image using the adjustment amount in the same manner as the sub image.

As seen above, in this embodiment, in the case where the image capturing method is the cross view method, when the direction and the magnitude of the disparity vector which has been detected for the block are negative and greater than the first threshold, the large quantization step is applied to the block. As a result, the block is coded as a blurred image. Here, as shown in FIG. 5A, in the picture indicated by the video signals, the magnitude of the disparity vector of the block including the image at the intersection point in the cross view method is 0 (or substantially 0). Thus, when the first threshold is 0, the block to which the large quantization step is applied is an area in which a long-distance view at a position where the capturing distance L is longer than the distance to the intersection point is shown. Consequently, it is possible to blur an image of the area in which the long-distance view at the position where the capturing distance L is longer than the distance to the intersection point is shown. Moreover, if the block including the image at the intersection point is an area significant to the viewer, it is possible to prevent the image of the significant area from being blurred, and to blur an image of an area in which a long-distance view is shown other than the significant area.

Moreover, in this embodiment, in the case where the image capturing method is the parallel view method, when the direction and the magnitude of the disparity vector which has been detected for the block are positive and less than the second threshold, the large quantization step is applied to the block. As a result, the block is coded as a blurred image. Here, as shown in FIG. 5B, in the picture indicated by the video signals, the magnitude of the disparity vector of the block including the image of the object at the distance La is the second threshold. Thus, the block to which the large quantization step is applied is an area in which a long-distance view at a position where the capturing distance L is farther than the distance La is shown. Consequently, it is possible to blur an image of the area in which the long-distance view at the position where the capturing distance L is farther than the distance La is shown. Moreover, if the block including the image of the object at the distance La is an area significant to the viewer, it is possible to prevent the image of the significant area from being blurred, and to blur an image of an area in which a long-distance view is shown other than the significant area.

As described above, this embodiment makes it possible to reduce, through the blurring process, the fatigue of the viewer which is caused by the three-dimensional viewing, and to prevent the blurring process from being performed on the significant area due to the image capturing method. To put it differently, in this embodiment, it is possible to properly perform, for a disparity distribution which differs depending on the image capturing method, image quality enhancement on the significant area and the blurring process on the area of the long-distance view (background), by determining the image capturing method based on the angle of convergence.

It is to be noted that although the first threshold is 0 in this embodiment, the first threshold may be a value other than 0. Moreover, although the image coding apparatus 300 uses the fixed first and second thresholds in this embodiment, the first and second thresholds may be changed. For instance, the coding adjustment unit 303 receives a signal from the outside of the image coding apparatus 300, and changes the first or second threshold according to the signal. With this, it is possible to change the significant area.

(Modification 1)

The following describes Modification 1 of this embodiment. Although the image of the current block is blurred by increasing the quantization step in this embodiment, the image of the current block may be blurred by rounding down a frequency coefficient in a high frequency domain of the block.

Stated differently, the coding adjustment unit 303 according to this modification provides the conversion unit 308 with the adjustment signal. The adjustment amount indicated by the adjustment signal is treated as an extent of the high frequency domain rounded down by the conversion unit 308.

Specifically, upon obtaining the adjustment signal from the coding adjustment unit 303, the conversion unit 308 rounds down, among frequency coefficients of blocks which are generated through orthogonal transformation, a frequency coefficient in a high frequency domain having an extent corresponding to the adjustment amount indicated by the adjustment signal. In other words, the conversion unit 308 changes a frequency coefficient in an extensive high frequency domain into 0 when the adjustment amount is large, and changes a frequency coefficient in a narrow high frequency domain into 0 when the adjustment amount is small.

It is to be noted that the rounding down of the frequency coefficient may be performed together with the increase of the quantization step.

(Modification 2)

The following describes Modification 2 of this embodiment. An image coding apparatus according to this modification is characterized by adjusting a focal point and properly blurring an image of an area in which a long-distance view at a position where a capturing distance L is longer than a distance to the focal point is shown, without blurring an image of an object at the focal point.

Figure 8:
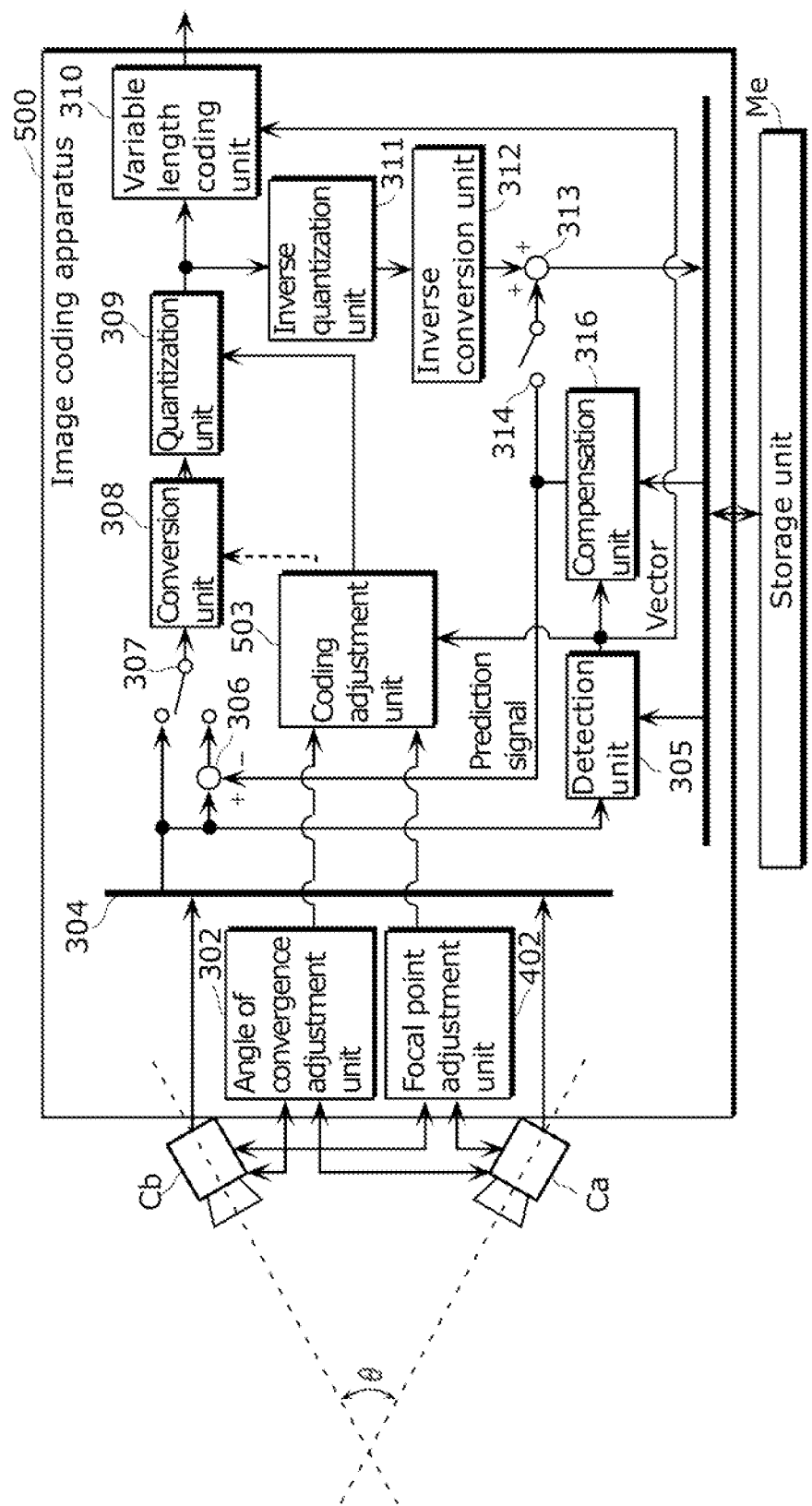
FIG. 8 is a block diagram showing a configuration of an image coding apparatus according to a modification of Embodiment 1 of the present invention.

FIG. 8 is a block diagram showing a configuration of the image coding apparatus according to this modification.

In comparison to the image coding apparatus 300, an image coding apparatus 500 according to this modification further includes a focal point adjustment unit 402, and a coding adjustment unit 503 instead of the coding adjustment unit 303 of the image coding apparatus 300.

The focal point adjustment unit 402 adjusts focal points of the cameras Ca and Cb. Here, the focal point adjustment unit 402 adjusts the focal points (focal distances) of the cameras Ca and Cb to be the same. Moreover, the focal point adjustment unit 402 provides the coding adjustment unit 503 with a focal point signal indicating a position of a block including an image of a focused object in a picture provided from each of the cameras Ca and Cb. For instance, the focal point adjustment unit 402 discerns the block by autofocus (specifically, contrast detection method or the like).

Upon obtaining the focal point signal for each picture, the coding adjustment unit 503 sets, as the first or second threshold, a magnitude of a disparity vector which the detection unit 305 has detected for the block at the position indicated by the focal point signal. In other words, when the image capturing method signal obtained from the angle of convergence adjustment unit 302 indicates the cross view method, the coding adjustment unit 503 sets the magnitude of the disparity vector as the first threshold. In contrast, when the image capturing method signal obtained from the angle of convergence adjustment unit 302 indicates the parallel view method, the coding adjustment unit 503 sets the magnitude of the disparity vector as the second threshold.

Figure 9A:
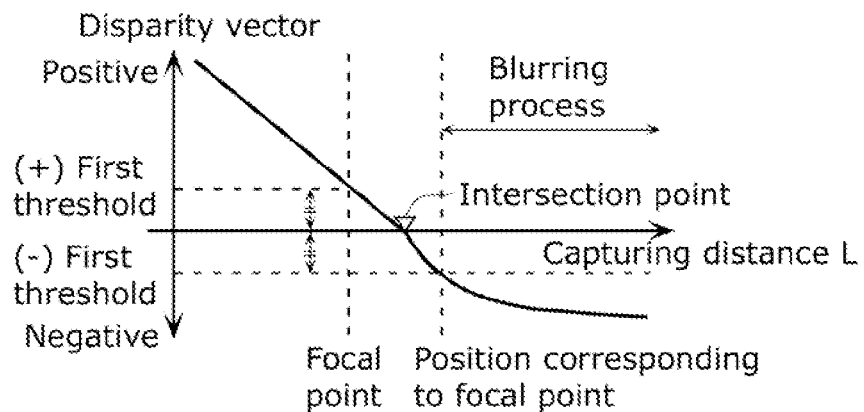
FIG. 9A is a graph showing a range within which the blurring process is performed in the cross view method according to the modification of Embodiment 1 of the present invention.

FIG. 9A is a graph showing a range within which the blurring process is performed in the cross view method.

As shown in FIG. 9A, the first threshold is set to the magnitude of the disparity vector at the focal point. The blurring process is performed on the block having the negative direction and the magnitude of the disparity vector greater than the first threshold.

Here, for example, there is a case where the capturing distance L of the focal point is shorter than a distance to the intersection point. In this case, a position at which a disparity vector having a negative direction and a magnitude equal to the first threshold is generated is referred to as a position corresponding to a focal point. A direction and a magnitude of a disparity vector of an image of an object at the capturing distance L longer than a distance to the position corresponding to the focal point are negative and greater than the first threshold, respectively. As a result, the blurring process is performed on the image (long-distance view) of the object at the capturing distance L longer than the distance to the position corresponding to the focal point.

It is to be noted that even when the capturing distance L of the focal point is shorter than the distance to the intersection point, the blurring process may be performed not on an image at the position corresponding to the focal point but on an image (long-distance view) of an object at a capturing distance L longer than the distance to the focal point.

Furthermore, a fourth threshold (not shown) having a magnitude greater than the magnitude of the disparity vector at the focal point by a predetermined magnitude or ratio may be set. In this case, in the cross view method, a direction of a disparity vector of an image of an object at a capturing distance L that is much shorter than a distance to a position that is closer than the focal point and corresponds to the fourth threshold is positive, and a magnitude of the disparity vector is greater than the fourth threshold. The coding adjustment unit 303 determines, for a block of which disparity vector having the positive direction and the magnitude greater than the fourth threshold has been detected, an adjustment amount corresponding to the magnitude of the disparity vector, and provides the quantization unit 309 with an adjustment signal indicating the adjustment amount. As a result, the blurring process is also performed on an image of an object such as a foreground at the capturing distance L shorter than the distance to the focal point. This makes it possible to reduce the fatigue of the viewer which is caused by a large disparity of the foreground.

Figure 9B:
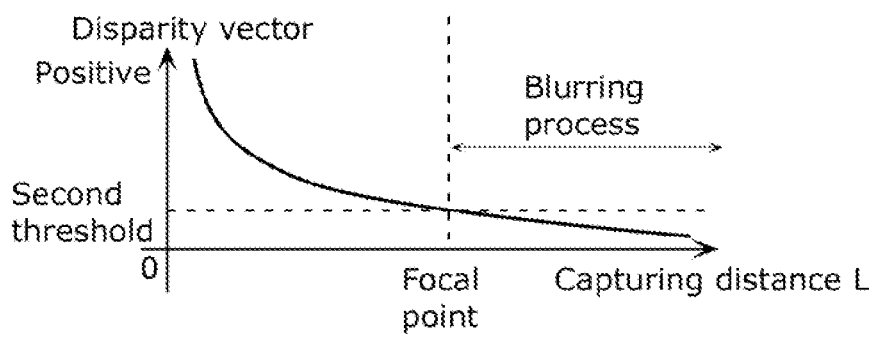
FIG. 9B is a graph showing a range within which the blurring process is performed in the parallel view method according to the modification of Embodiment 1 of the present invention.

FIG. 9B is a graph showing a range within which the blurring process is performed in the parallel view method.

As shown in FIG. 9B, the second threshold is set to the magnitude of the disparity vector at the focal point. Thus, in the parallel view method, a direction of a disparity vector of an image of an object at the capturing distance L longer than the distance to the focal point is positive, and a magnitude of the disparity vector is less than the second threshold. As a result, the blurring process is performed on the image of the object at the capturing distance L longer than the distance to the focal point.

As stated above, this modification makes it possible to clarify the image of the area (focus area) including the image of the object at the focal point, and blur the image of the area in which the long-distance view other than the focus area is shown, regardless of the image capturing method. To put it differently, this modification makes it possible to generate a more natural three-dimensional image of which a focal point and an intersection point are highly likely to be displaced at the time of capturing by a common camera and which matches picture composition intended by the camera operator.

Figure 9C:
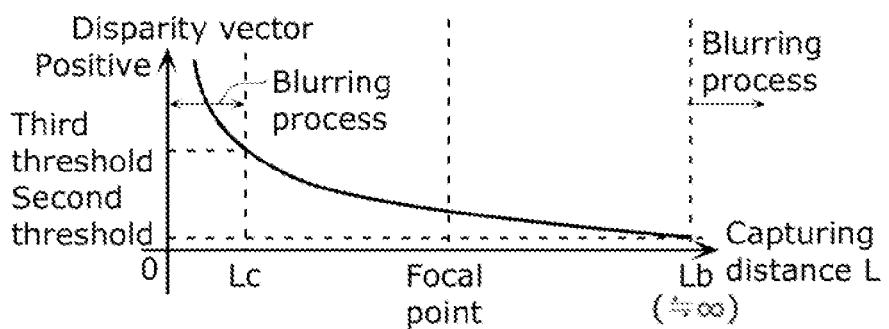
FIG. 9C is a graph showing another range within which a blurring process is performed in the parallel view method according to the modification of Embodiment 1 of the present invention.

FIG. 9C is a graph showing another range within which the blurring process is performed in the parallel view method.

As shown in FIG. 9C, the second threshold may be set to a value that is less than the magnitude of the disparity vector at the focal point and close to 0 as much as possible. In this case, in the parallel view method, a direction of a disparity vector of an image (e.g. image of a distant background or the like) of an object at a capturing distance L that is longer than a distance to a position Lb that is a position farther than the focal point and corresponds to the second threshold is positive, and a magnitude of the disparity vector is less than the second threshold. As a result, the blurring process is performed on the image of the object such as the background at the capturing distance L longer than the distance to the focal point.

Here, a third threshold having a magnitude greater than the magnitude of the disparity vector at the focal point by a predetermined magnitude or ratio may be further set. In this case, in the parallel view method, a direction of a disparity vector of an image of an object at a capturing distance L that is much shorter than a distance to a position Lc that is closer than the focal point and corresponds to the third threshold is positive, and a magnitude of the disparity vector is greater than the third threshold. The coding adjustment unit 303 determines, for a block of which disparity vector having the positive direction and the magnitude greater than the third threshold has been detected, an adjustment amount corresponding to the magnitude of the disparity vector, and provides the quantization unit 309 with an adjustment signal indicating the adjustment amount. As a result, the blurring process is also performed on the image of the object such as the foreground at the capturing distance L shorter than the distance to the focal point. This makes it possible to reduce the fatigue of the viewer which is caused by the large disparity of the foreground.

Moreover, in such a case, the disparity (disparity vector) is caused for the image of the object at the focal point. There is a case where such a disparity displaces a position of an image of an object in each of the main image and the sub image, which makes it hard to see the image of the object.

Figure 9D:
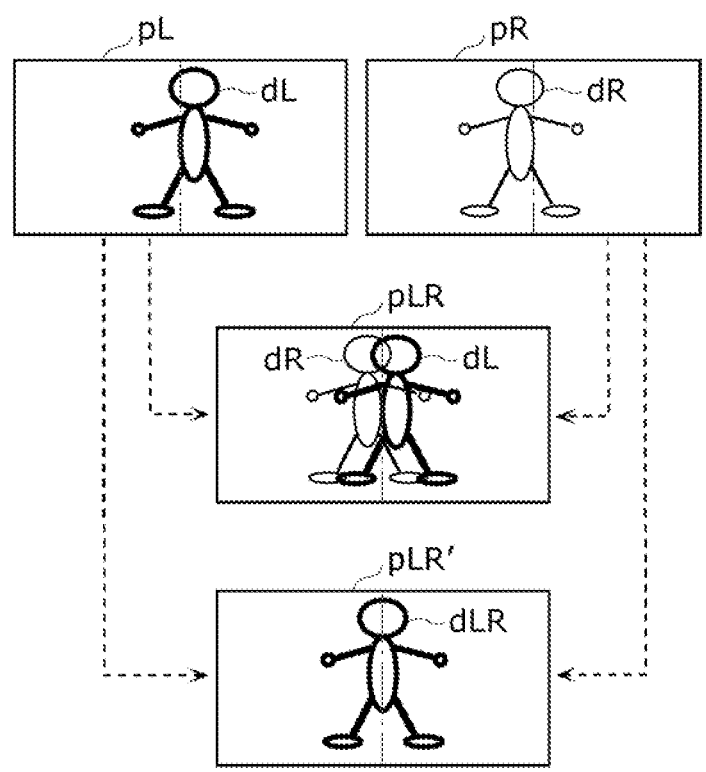
FIG. 9D is a diagram showing an image of an object at a focal point in the parallel view method according to the modification of Embodiment 1 of the present invention.

FIG. 9D is a diagram showing an image of an object at a focal point.

A main image pL and a sub image pR show an image dL and an image dR of the object, respectively. Moreover, the object is focused. Here, a disparity (disparity vector) at the focal point displaces positions of the images dL and dR of the object. For instance, the position of the image dL of the object is displaced to the right from the center of the main image pL, and the position of the image dR of the object is displaced to the left from the center of the sub image pR.

Thus, when an image decoding apparatus (image reproducing apparatus) simply reproduces the main image pL and the sub image pR, the images dL and dR of the object that are respectively displaced to the right and the left are displayed in a three-dimensional image that can be obtained by three-dimensionally viewing the main image pL and the sub image pR. In response, the image decoding apparatus (reproducing apparatus) may display a three-dimensional image pLR' by shifting the images dL and dR of the object so that a magnitude of a disparity vector becomes 0. This makes it possible to clearly display the image dLR of the object at the focal point.

It is to be noted that although the image coding apparatus 500 includes the single focal point adjustment unit 402 in this modification, the focal point adjustment unit 402 may be provided for each of the cameras Ca and Cb.

It is also to be noted that the angle of convergence adjustment unit 302 may rotate the cameras Ca and Cb in this embodiment and its modifications. Stated differently, the angle of convergence adjustment unit 302 may receive, from the outside of the image coding apparatus, a signal indicating an angle to be set (set angle), and rotate the cameras Ca and Cb so that an angle of convergence θ becomes the set angle. In this case, the angle of convergence adjustment unit 302 determines the set angle as the angle of convergence θ. Moreover, although the image coding apparatus includes the single angle of convergence adjustment unit 302 in this embodiment and its modifications, the angle of convergence adjustment unit 302 may be provided for each of the cameras Ca and Cb.

(Embodiment 2)

An image coding apparatus according to Embodiment 2 is characterized by determining an image capturing method based on a distribution of disparity vectors (disparity distribution) detected for respective blocks making up a picture.

Figure 10:
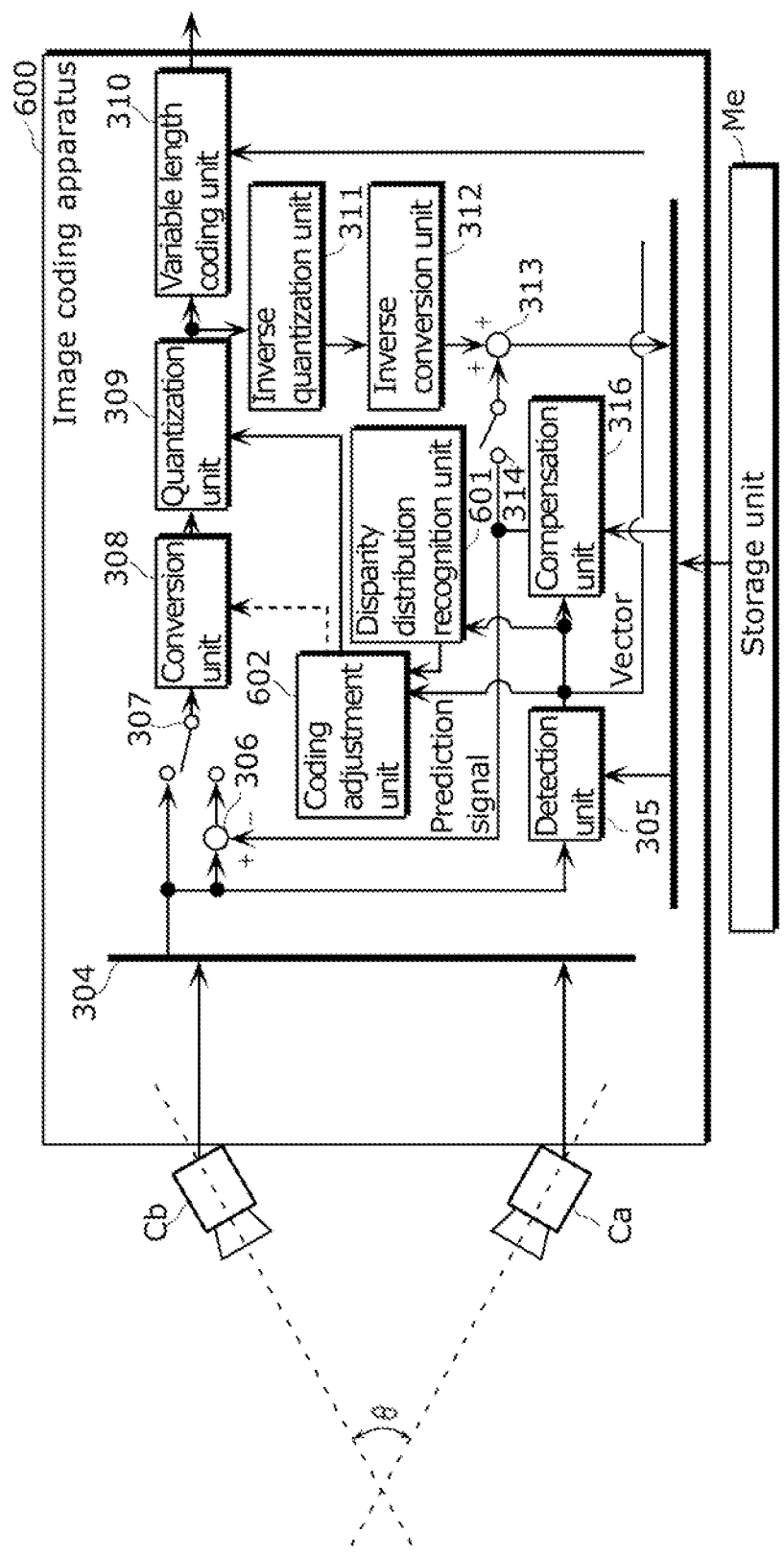
FIG. 10 is a block diagram showing a configuration of an image coding apparatus according to Embodiment 2 of the present invention.

FIG. 10 is a block diagram showing a configuration of an image coding apparatus according to Embodiment 2 of the present invention.

An image coding apparatus 600 according to this embodiment includes a disparity distribution recognition unit 601, a coding adjustment unit 602, the selector 304, the detection unit 305, the subtractor 306, the switch 307, the conversion unit 308, the quantization unit 309, the variable length coding unit 310, the inverse quantization unit 311, the inverse conversion unit 312, the adder 313, the switch 314, and the compensation unit 316. It is to be noted that the same reference signs are given to, among the elements included in the image coding apparatus 600, the elements that are the same as those included in the image coding apparatus 300 according to Embodiment 1, and detailed descriptions of thereof are omitted. In other words, in comparison to the image coding apparatus 300 according to Embodiment 1, the image coding apparatus 600 includes the disparity distribution recognition unit 601 and the coding adjustment unit 602 instead of the angle of convergence adjustment unit 302 and the coding adjustment unit 303.

The image coding apparatus 600 generates a disparity distribution, and determines whether an image capturing method is the parallel view method or the cross view method. In order to generate the disparity distribution, the image coding apparatus 600 causes the cameras Ca and Cb to test capture a main image and a sub image.

To put it differently, the image coding apparatus 600 codes (performs orthogonal transformation and quantization on) an I-picture in a video signal provided from the camera Ca, decodes (performs inverse orthogonal transformation and inverse quantization on) the I-picture, and stores a local decoded image signal of the I-picture in the storage unit Me.

Next, the detection unit 305 obtains a picture in a video signal provided from the camera Cb, and detects, for each block making up the picture, a disparity vector of the block. Stated differently, the detection unit 305 detects the disparity vector of each block in the picture of the sub image with reference to, as a reference image, the local decoded image signal of the I-picture stored in the storage unit Me.

The disparity distribution recognition unit 601 obtains the disparity vectors detected by the detection unit 305, and generates a distribution of the disparity vectors of the respective blocks in the picture of the sub image, that is, a disparity distribution. Then, the disparity distribution recognition unit 601 determines whether or not vectors having a positive direction and vectors having a negative direction coexist in the disparity distribution, and provides the coding adjustment unit 602 with an image capturing method signal indicating the determination result. Specifically, when the disparity distribution recognition unit 601 determines that they coexist, the disparity distribution recognition unit 601 provides the image capturing method signal indicating that the image capturing method is the cross view method, and when the disparity distribution recognition unit 601 determines that they do not coexist, the disparity distribution recognition unit 601 provides the image capturing method signal indicating that the image capturing method is the parallel view method.

The coding adjustment unit 602 obtains the image capturing method signal from the disparity distribution recognition unit 601. Then, similar to the coding adjustment unit 303 according to Embodiment 1, when the image capturing method signal indicates the cross view method, the coding adjustment unit 602 determines, for a block having a disparity vector of which a magnitude and a direction are greater than the first threshold and negative, respectively, an adjustment amount according to the magnitude of the disparity vector, and provides the quantization unit 309 with an adjustment signal indicating the adjustment amount. In contrast, when the image capturing method signal indicates the parallel view method, the coding adjustment unit 602 determines, for a block having a disparity vector of which a magnitude and a direction are less than the second threshold and positive, respectively, an adjustment amount according to the magnitude of the disparity vector, and provides the quantization unit 309 with an adjustment signal indicating the adjustment amount.

As described above, this embodiment determines the image capturing method based on the disparity distribution, and thus makes it possible to simplify the configuration and processes of the image coding apparatus without requiring the sensor which detects the angles of the cameras Ca and Cb, the angle of convergence adjustment unit 302, and so on, as opposed to Embodiment 1.

(Modification 1)

The following describes Modification 1 of this embodiment. Although the image of the current block is blurred by increasing the quantization step in this embodiment, just like Modification 1 of Embodiment 1, the image of the current block may be blurred by rounding down a frequency coefficient in a high frequency domain of the block.

In other words, the coding adjustment unit 602 according to this modification provides the conversion unit 308 with the adjustment signal. The adjustment amount indicated by the adjustment signal is treated as an extent of the high frequency domain rounded down by the conversion unit 308.

Specifically, upon obtaining the adjustment signal from the coding adjustment unit 602, the conversion unit 308 rounds down, among frequency coefficients of blocks which are generated through orthogonal transformation, a frequency coefficient in a high frequency domain having an extent corresponding to the adjustment amount indicated by the adjustment signal. To put it differently, when the adjustment amount is large, the conversion unit 308 converts a frequency coefficient in an extensive high frequency domain into 0, and when the adjustment amount is small, the conversion unit 308 converts a frequency coefficient in a narrow high frequency domain into 0.

It is to be noted that the rounding down of the frequency coefficient may be performed together with the increase of the quantization step.

(Modification 2)

The following describes Modification 2 of this embodiment. Similar to Modification 2 of Embodiment 1, an image coding apparatus according to this modification is characterized by adjusting a focal point and properly blurring an image of an area in which a long-distance view at a position where a capturing distance L is longer than a distance to the focal point is shown, without blurring an image of an object at the focal point.

Figure 11:
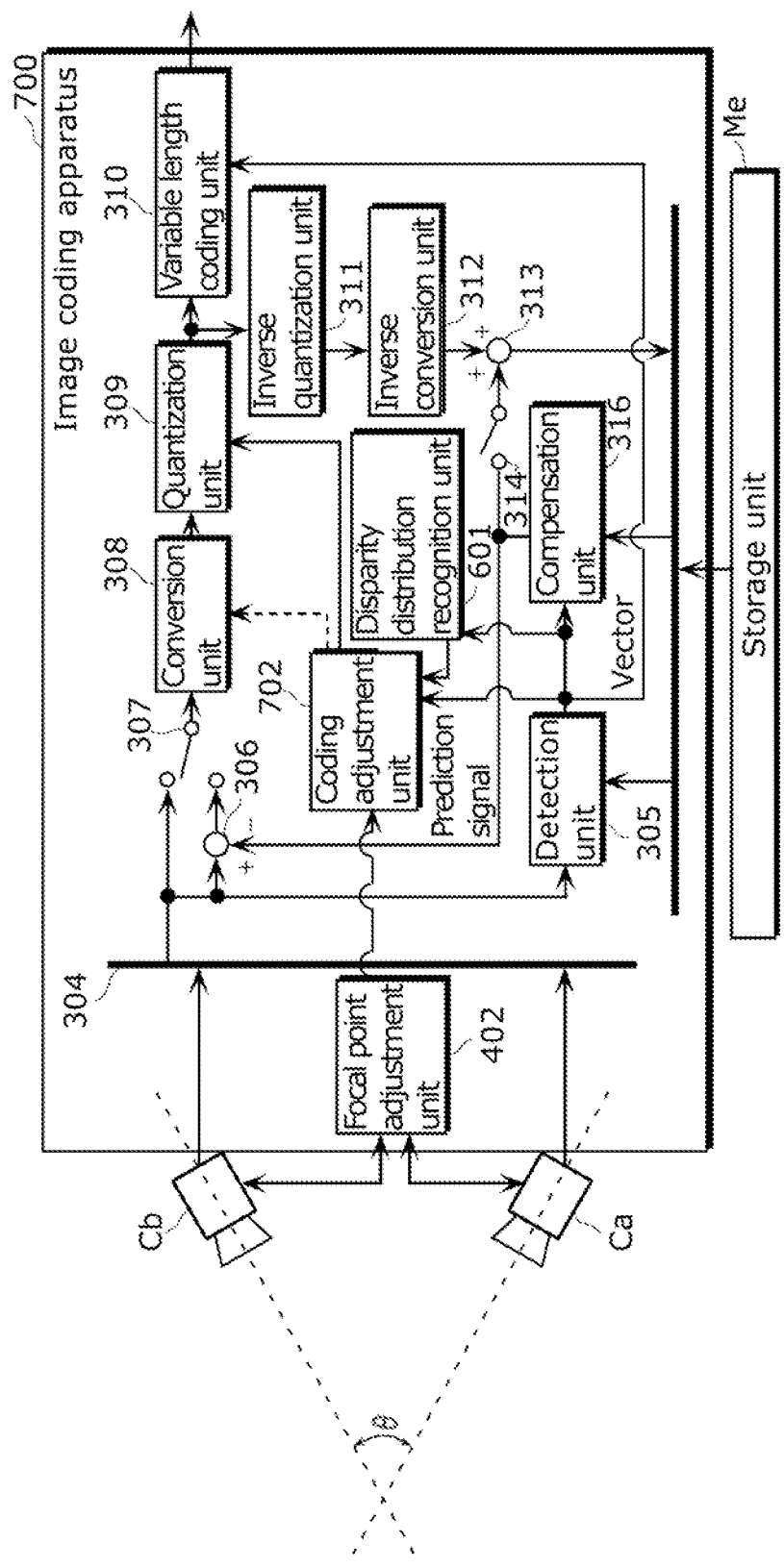
FIG. 11 is a block diagram showing a configuration of an image coding apparatus according to a modification of Embodiment 2 of the present invention.

FIG. 11 is a block diagram showing a configuration of the image coding apparatus according to this modification.

In comparison to the image coding apparatus 600, an image coding apparatus 700 according to this modification further includes the focal point adjustment unit 402, and a coding adjustment unit 702 instead of the coding adjustment unit 602 of the image coding apparatus 600.

The focal point adjustment unit 402 adjusts focal points of the cameras Ca and Cb. Here, the focal point adjustment unit 402 adjusts the focal points (focal distances) of the cameras Ca and Cb to be the same. Moreover, the focal point adjustment unit 402 provides the coding adjustment unit 702 with a focal point signal indicating a position of a block including an image of a focused object in a picture provided from each of the cameras Ca and Cb.

Upon obtaining the focal point signal for each picture, the coding adjustment unit 702 sets, as the first or second threshold, a magnitude of a disparity vector which the detection unit 305 has detected for the block at the position indicated by the focal point signal. Stated differently, when the image capturing method signal obtained from the disparity distribution recognition unit 601 indicates the cross view method, the coding adjustment unit 702 sets the magnitude of the disparity vector as the first threshold. In contrast, when the image capturing method signal obtained from the disparity distribution recognition unit 601 indicates the parallel view method, the coding adjustment unit 702 sets the magnitude of the disparity vector as the second threshold.

As stated above, just like Modification 2 of Embodiment 1, this modification makes it possible to clarify the image of the area (focus area) including the image of the object at the focal point, and blur the image of the area in which the long-distance view other than the focus area is shown, regardless of the image capturing method. It is to be noted that although the image coding apparatus 700 includes the single focal point adjustment unit 402 in this modification, the focal point adjustment unit 402 may be provided for each of the cameras Ca and Cb.

(Embodiment 3)

The following describes a system including an image coding apparatus according to Embodiment 3 of the present invention.

Figure 12:
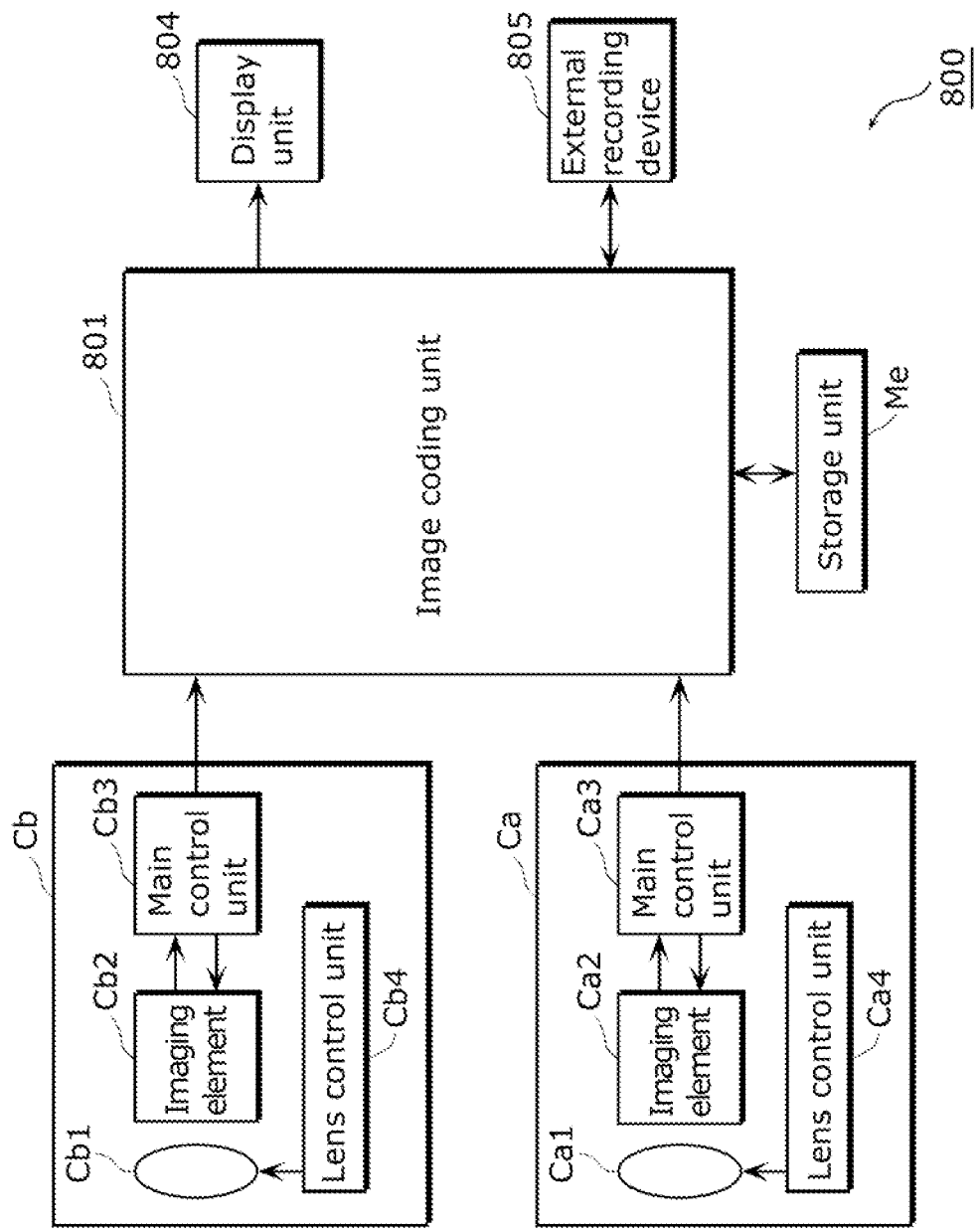
FIG. 12 is a block diagram showing a configuration of an image coding system according to Embodiment 3 of the present invention.

FIG. 12 is a block diagram showing a configuration of an image coding system according to this embodiment.

An image coding system 800 includes an image coding unit 801, a storage unit Me, cameras Ca and Cb, a display unit 804, and an external recording device 805. The storage unit Me and the cameras Ca and Cb in this embodiment are the same as the storage unit Me and the cameras Ca and Cb in Embodiments 1 and 2 and their modifications. Moreover, the image coding unit 801 in this embodiment corresponds to the image coding apparatus 300, 500, 600 or 700 in Embodiments 1 and 2 and their modifications.

The camera Ca includes a lens Ca1, an imaging element Ca2, a main control unit Ca3, and a lens control unit Ca4. The imaging element Ca2 includes, for instance, a CCD (Charge Coupled Device). The image element Ca2 obtains an optical signal through the lens Ca1, converts the optical signal into an electrical signal, and provides the main control unit Ca3 with the electrical signal. In response to control performed by the main control unit Ca3, the lens control unit Ca4 adjusts a focal point of the lens Ca1 and so on. The main control unit Ca3 includes, for example, an IC (Integrated Circuit). The main control unit Ca3 obtains the electrical signal from the imaging element Ca2, and provides the image coding unit 801 with the electrical signal as a video signal. Furthermore, the main control unit Ca3 controls the imaging element Ca2 and the lens control unit Ca4 so as to adjust a shutter speed, a gain, a focal point, and so on.

The camera Cb includes a lens Cb1, an imaging element Cb1, a main control unit Cb3, and a lens control unit Cb4. These elements included in the camera Cb are the same as the elements included in the camera Ca.

It is to be noted that each of the main control units Ca3 and Cb3 performs a coordinated operation so that the cameras Ca and Cb have the same focal point, shutter speed, and so on.

The display unit 804 includes, for instance, a liquid crystal display. The display unit 804 obtains the stereo video signal from the image coding unit 801, and displays a main image and a sub image indicated by the stereo video signal. It is to be noted that the display unit 804 may obtain a local decoded image signal from the image coding unit 801, and display a main image and a sub image indicated by the local decoded image signal.

The external recording device 805 is configured so that a recording medium such as a CD (Compact Disc), an MO (Magnet Optical Disk), a DVD (Digital Versatile Disk), a BD (Blu-ray Disc), and a semiconductor memory can be attached to the external recording device 805. The external recording device 805 obtains a coded stereo video signal from the image coding unit 801, and writes the coded stereo video signal on the recording medium attached to the external recording device 805.

(Embodiment 4)

Figure 13:
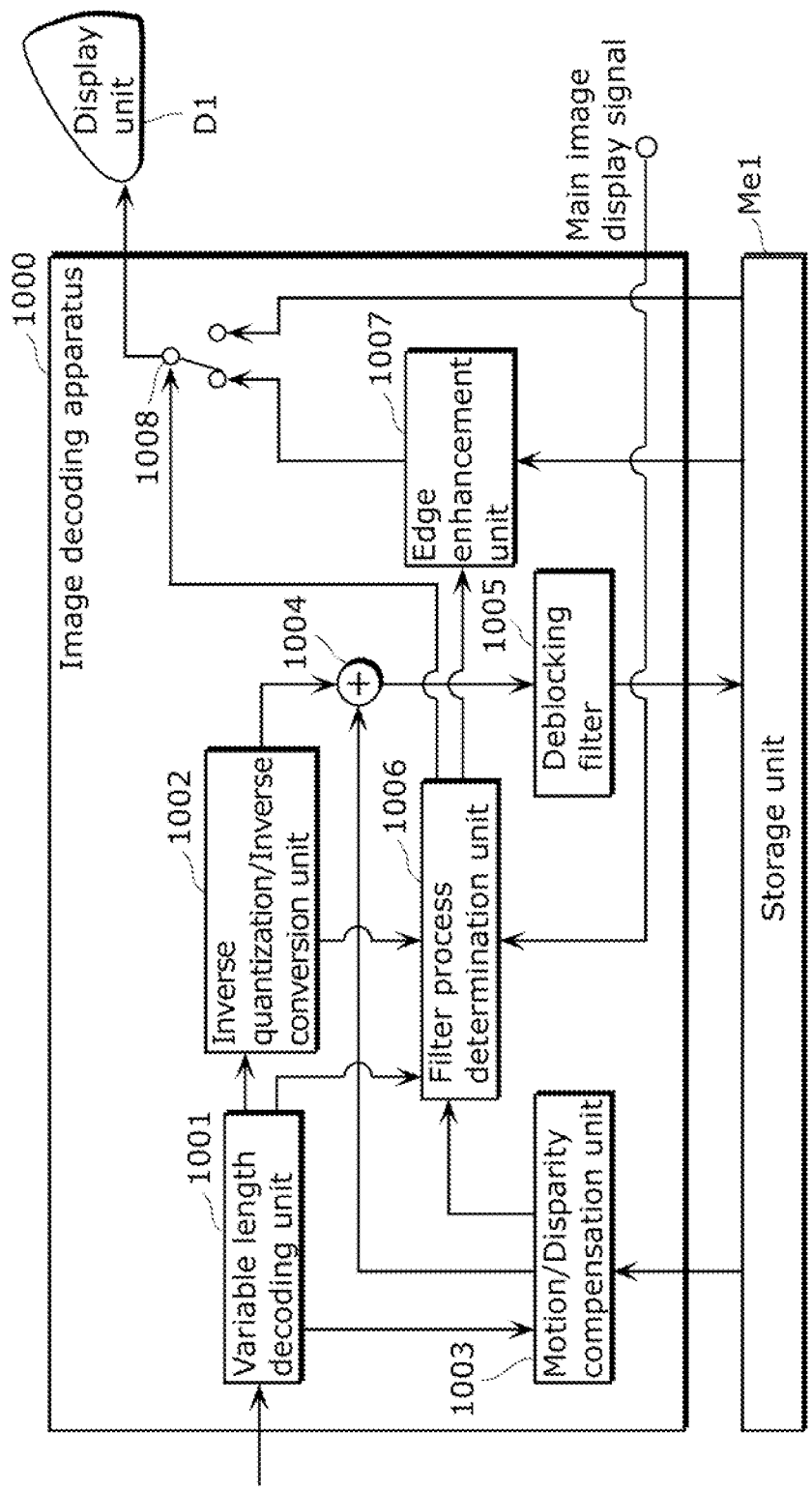
FIG. 13 is a block diagram showing a configuration of an image decoding apparatus according to Embodiment 4 of the present invention.

FIG. 13 is a block diagram showing a configuration of an image decoding apparatus according to Embodiment 4 of the present invention.

An image decoding apparatus 1000 is an apparatus which decodes a coded stereo video signal provided from the image coding apparatus according to Embodiments 1 and 2 or their modifications, and includes a variable length decoding unit 1001, an inverse quantization/inverse conversion unit 1002, a motion/disparity compensation unit 1003, an adder 1004, a deblocking filter 1005, a filter process determination unit 1006, an edge enhancement unit 1007, and a switch 1008.

Moreover, the image decoding apparatus 1000 decodes, while storing data into or reading data from a storage unit Me1, each of pictures of a main image and a sub image in the coded stereo video signal on block-by-block basis, and displays the decoded pictures on the display unit D1 for three-dimensionally viewing. Furthermore, when the image decoding apparatus 1000 obtains a main image display signal from the outside, the image decoding apparatus 1000 displays, on the display unit D1, only the main image in the coded stereo video signal. In other words, when the display unit D1 is not compatible with 3D video display, the image decoding apparatus 1000 displays a 2D video on the display unit D1.

It is to be noted that the blurring process described in Embodiments 1 and 2 or their modifications is performed not only on the sub image but also on the main image in the coded stereo video signal that is decoded in this embodiment.

The variable length decoding unit 1001 performs variable length decoding on the coded stereo video signal. This decodes the image capturing method signal, the quantization value, the quantization step, and the motion vector or the disparity vector on which variable length coding has been performed. To put it differently, the coded stereo video signal which is provided from the image coding apparatus according to Embodiments 1 and 2 or their modifications includes the image capturing method signal on which the variable length coding has been performed, the quantization value and the quantization step (quantization parameter) on which, the variable length coding has been performed on a block-by-block basis, and the motion vector or the disparity vector on which the variable length coding has been performed on a block-by-block basis.

The variable length decoding unit 1001 provides the motion/disparity compensation unit 1003 with the motion vector or the disparity vector, the inverse quantization/inverse conversion unit 1002 with the quantization value and the quantization step (quantization parameter), and the filter process determination unit 1006 with the image capturing method signal.

Upon obtaining the quantization value and the quantization step (quantization parameter) from the variable length decoding unit 1001 on a block-by-block basis, the inverse quantization/inverse conversion unit 1002 performs inverse quantization on the quantization value using the quantization step, and generates an inverse-quantized frequency coefficient on a block-by-block basis accordingly. Moreover, the inverse quantization/inverse conversion unit 1002 performs inverse orthogonal transformation (e.g. inverse discrete cosine transform) on the inverse-quantized frequency coefficient. As a result, the inverse quantization/inverse conversion unit 1002 converts the inverse-quantized frequency coefficient into an image signal, that is, converts a domain of the inverse-quantized frequency coefficient from a frequency domain to a space domain, and provides the adder 1004 with the image signal. Furthermore, the inverse quantization/inverse conversion unit 1002 provides the filter process determination unit 1006 with the quantization step used for the inverse quantization on the block-by-block basis.

When a current image to be decoded is a main image of an I-picture, the adder 1004 provides the deblocking filter 1005 with the image signal provided from the inverse quantization/inverse conversion unit 1002, as a decoded image signal. Moreover, when the current image is an image (main image or sub image) of a P-picture or a B-picture, the adder 1004 adds the image signal provided from the inverse quantization/inverse conversion unit 1002 to a prediction signal provided from the motion/disparity compensation unit 1003, and provides the deblocking filter 1005 with the addition result as the decoded image signal.

Upon obtaining the decoded image signal from the adder 1004, the deblocking filter 1005 filters the decoded image signal. Stated differently, the deblocking filter 1005 removes a distortion (blocking distortion) in an image of a block indicated by the decoded image signal, and stores the decoded image signal from which the distortion has been removed into the storage unit Me1.

When the current image (current block to be decoded) is the main image of the P-picture or the B-picture, the motion/disparity compensation unit 1003 performs motion compensation using the motion vector obtained from the variable length decoding unit 1001, to generate the prediction signal, and provides the adder 1004 with the prediction signal. In other words, the motion/disparity compensation unit 1003 refers to, as a reference image, the decoded image signal which is stored in the storage unit Me1 and indicates the main image that has been decoded (I-picture or P-picture). Then, the motion/disparity compensation unit 1003 spatially shifts a block in the reference image according to the motion vector, generates a signal indicating an image of the block as the prediction signal, and provides the prediction signal.

On the other hand, when the current image (current block) is a sub image of the P-picture, the motion/disparity compensation unit 1003 performs disparity compensation using the disparity vector obtained from the variable length decoding unit 1001, to generate a prediction signal, and provides the adder 1004 with the prediction signal. To put it differently, the motion/disparity compensation unit 1003 refers to, as a reference image, the decoded image signal which is stored in the storage unit Me1 and indicates the main image that has been decoded (I-picture, P-picture or B-picture). Then, the motion/disparity compensation unit 1003 spatially shifts a block in the reference image according to the disparity vector, generates a signal indicating an image of the block as the prediction signal, and provides the prediction signal. Moreover, the motion/disparity compensation unit 1003 provides the filter process determination unit 1006 with the disparity vector used for the disparity compensation.

Upon obtaining an adjustment signal from the filter process determination unit 1006, the edge enhancement unit 1007 performs a process of enhancing an edge of the image indicated by the decoded image signal stored in the storage unit Me1, based on the adjustment signal, and provides the switch 1008 with the decoded image signal on which the process has been performed.

The switch 1008 switches between connections according to control performed by the filter process determination unit 1006. Stated differently, the switch 1008 connects the display unit D1 to the storage unit Me1 through the edge enhancement unit 1007 or connects the display unit D1 to the storage unit Me1 without the edge enhancement unit 1007.

When the main image and the sub image are displayed, that is, when the main image display signal indicating that the only main image should be displayed is not obtained, the filter process determination unit 1006 causes the switch 1008 to connect the display unit D1 to the storage unit Me1. As a result, the decoded image signal which is stored in the storage unit Me1 and indicates the main image and the sub image is read out, and the main image and the sub image are alternately displayed on the display unit D1. Thus, in this case, the image is three-dimensionally displayed.

On the other hand, when the main image display signal indicating that the only main image should be displayed is obtained, the filter process determination unit 1006 causes the switch 1008 to switch between the connections for each block of the main image to be displayed. In other words, the filter process determination unit 1006 determines, for each block, whether or not the blurring process has been performed on the block at the time of coding, based on the disparity vector which is provided from the motion/disparity compensation unit 1003 and corresponds to the block and the image capturing method signal provided from the variable length decoding unit 1001. Then, the filter process determination unit 1006 controls the switch 1008 according to the determination result.

Specifically, in the case where the image capturing method signal indicates the cross view method, the filter process determination unit 1006 determines that the blurring process has been performed on the block at the time of coding, when the disparity vector corresponding to the block has a negative direction and a magnitude greater than the first threshold. Moreover, in the case where the image capturing method signal indicates the parallel view method, the filter process determination unit 1006 determines that the blurring process has been performed on the block at the time of coding, when the disparity vector corresponding to the block has a positive direction and a magnitude less than the second threshold.

When the filter process determination unit 1006 determines that the blurring process has not been performed, the filter process determination unit 1006 causes the switch 1008 to connect the display unit D1 to the storage unit Me1. Consequently, the decoded image signal which is stored in the storage unit Me1 and indicates the block of the main image is read out, and the block of the main image is displayed on the display unit D1. In contrast, when the filter process determination unit 1006 determines that the blurring process has been performed, the filter process determination unit 1006 causes the switch 1008 to connect the display unit D1 to the edge enhancement unit 1007. As a result, the edge enhancement unit 1007 reads, from the storage unit Me1, the decoded image signal on which the blurring process has been performed and indicates the block of the main image, enhances the edge of the main image (block) indicated by the decoded image signal, and displays the block of the main image on the display unit D1.

Moreover, when the filter process determination unit 1006 determines that the blurring process has been performed, the filter process determination unit 1006 determines the adjustment amount indicating a degree of blur, based on the quantization step which is provided from the inverse quantization/inverse conversion unit 1002 and is used for the inverse quantization of the block of the main image. To put it differently, the filter process determination unit 1006 subtracts a predetermined quantization step (e.g. the quantization step determined according to the image coding standards) from the quantization step used for the inverse quantization of the block of the main image, and determines the subtraction result as the adjustment amount. Then, the filter process determination unit 1006 provides the edge enhancement unit 1007 with the adjustment signal indicating the adjustment amount. Consequently, when the edge enhancement unit 1007 enhances the edge of the main image (block) indicated by the decoded image signal, the edge enhancement unit 1007 obtains the adjustment signal from the filter process determination unit 1006, and enhances the edge by the adjustment amount indicated by the adjustment signal.

As described above, the image decoding apparatus 1000 according to this embodiment makes it possible to properly decode, for three-dimensional viewing, the coded stereo video signal generated by the image coding apparatus according to Embodiments 1 and 2 or their modifications, and to display the stereo video signal on the display unit D1. Moreover, the image decoding apparatus 1000 according to this embodiment makes it possible to display only the main image on the display unit D1 when the display unit D1 is not compatible with the 3D video display. Here, even when the blurring process is performed on the main image at the time of coding, the image decoding apparatus 1000 makes it possible to properly enhance the edge of the blurred main image, and to display the main image as a clear 2D video on the display unit D1.

(Embodiment 5)

Figure 14:
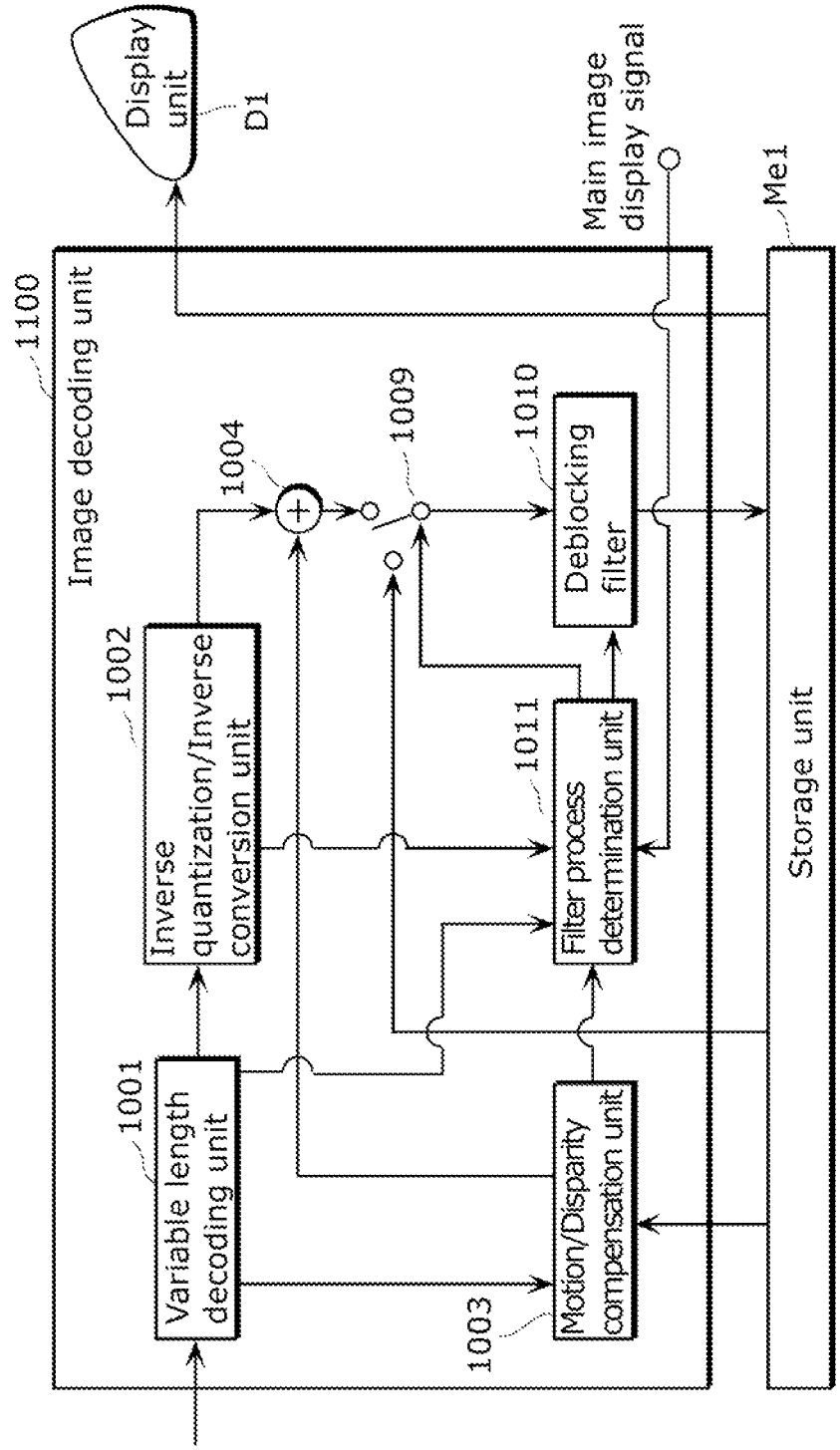
FIG. 14 is a block diagram showing a configuration of an image decoding apparatus according to Embodiment 5 of the present invention.

FIG. 14 is a block diagram showing a configuration of an image decoding apparatus according to Embodiment 5 of the present invention.

An image decoding apparatus 1100 is an apparatus which decodes a coded stereo video signal provided from the image coding apparatus according to Embodiments 1 and 2 or their modifications, and includes the variable length decoding unit 1001, the inverse quantization/inverse conversion unit 1002, the motion/disparity compensation unit 1003, the adder 1004, a deblocking filter 1010, a filter process determination unit 1011, and a switch 1009.

Moreover, the image decoding apparatus 1100 decodes, while storing data into or reading data from a storage unit Me1, each of pictures of a main image and a sub image in the coded stereo video signal on block-by-block basis, and displays the decoded pictures on a display unit D1 for three-dimensionally viewing. Furthermore, when the image decoding apparatus 1100 obtains a main image display signal from the outside, the image decoding apparatus 1100 displays, on the display unit D1, only the main image in the coded stereo video signal. In other words, when the display unit D1 is not compatible with 3D video display, the image decoding apparatus 1100 displays a 2D video on the display unit D1.

It is to be noted that the blurring process described in Embodiments 1 and 2 or their modifications is performed not only on the sub image but also on the main image in the coded stereo video signal that is decoded in this embodiment. Moreover, the same reference signs are given to, among the elements included in the image coding apparatus 1100, the elements that are the same as those included in the image coding apparatus 1000 according to Embodiment 4, and detailed descriptions of thereof are omitted.

The switch 1009 switches between connections according to control performed by the filter process determination unit 1011. Stated differently, the switch 1009 connects the adder 1004 or the storage unit Me1 to an input of the deblocking filter 1010.

Just like the deblocking filter 1005 in Embodiment 4, upon obtaining a decoded image signal from the adder 1004, the deblocking filter 1010 filters the decoded image signal. In other words, the deblocking filter 1010 removes a distortion (blocking distortion) in an image of a block indicated by the decoded image signal, and stores the decoded image signal from which the distortion has been removed into the storage unit Me1. Moreover, when the deblocking filter 1010 receives an adjustment signal from the filter process determination unit 1011, the deblocking filter 1010 performs filtering having a strength corresponding to an adjustment amount indicated by the adjustment signal.

When the main image and the sub image are displayed, that is, when the main image display signal indicating that the only main image should be displayed is not obtained, the filter process determination unit 1011 causes the switch 1009 to connect the adder 1004 to the input of the deblocking filter 1010. As a result, the decoded image signal which is stored in the storage unit Me1 and indicates the main image and the sub image is read out, and the main image and the sub image are alternately displayed on the display unit D1. Thus, in this case, the image is three-dimensionally displayed.

On the other hand, when the main image display signal indicating that the only main image should be displayed is obtained, the filter process determination unit 1011 causes the switch 1009 to switch between the connections for each block of the main image to be displayed. To put it differently, just like the filter process determination unit 1006 in Embodiment 4, the filter process determination unit 1011 determines, for each block, whether or not the blurring process has been performed on the block at the time of coding, based on the disparity vector which is provided from the motion/disparity compensation unit 1003 and corresponds to the block and the image capturing method signal provided from the variable length decoding unit 1001. Then, the filter process determination unit 1011 controls the switch 1009 according to the determination result.

When the filter process determination unit 1011 determines that the blurring process has not been performed, the filter process determination unit 1011 causes the switch 1009 to connect the adder 1004 to the input of the deblocking filter 1010. Consequently, the decoded image signal which is provided from the adder 1004 and indicates the block of the main image is filtered by the deblocking filter 1010, provided for the display unit D1 through the storage unit Me1, and displayed on the display unit D1.

On the other hand, when the filter process determination unit 1011 determines that the blurring process has been performed, the filter process determination unit 1011 first causes the switch 1009 to connect the adder 1004 to the input of the deblocking filter 1010. Consequently, the decoded image signal which is provided from the adder 1004 and indicates the block of the main image is filtered by the deblocking filter 1010, and stored in the storage unit Me1. Next, the filter process determination unit 1011 causes the switch 1009 to connect the storage unit Me1 to the input of the deblocking filter 1010. As a result, the decoded image signal which is filtered and stored in the storage unit Me1 is filtered again by the deblocking filter 1010. The decoded image signal which is filtered again is provided for the display unit D1 through the storage unit Me1, and displayed on the display unit Furthermore, when the filter process determination unit 1011 determines that the blurring process has been performed, the filter process determination unit 1011 determines the adjustment amount indicating a degree of blur, based on the quantization step which is provided from the inverse quantization/inverse conversion unit 1002 and is used for the inverse quantization of the block of the main image. Stated differently, the filter process determination unit 1011 subtracts a predetermined quantization step (e.g. the quantization step determined according to the image coding standards) from the quantization step used for the inverse quantization of the block of the main image, and determines the subtraction result as the adjustment amount. Then, the filter process determination unit 1011 provides the deblocking filter 1010 with an adjustment signal indicating the adjustment amount. Consequently, when the deblocking filter 1010 filters again the decoded image signal, the deblocking filter 1010 obtains the adjustment signal from the filter process determination unit 1011, and performs filtering having a strength corresponding to the adjustment amount indicated by the adjustment signal.

As described above, the image decoding apparatus 1100 according to this embodiment makes it possible to properly decode, for three-dimensional viewing, the coded stereo video signal generated by the image coding apparatus according to Embodiments 1 and 2 or their modifications, and to display the stereo video signal on the display unit D1. Moreover, the image decoding apparatus 1100 according to this embodiment makes it possible to display only the main image on the display unit D1 when the display unit D1 is not compatible with the 3D video display. Here, even when the blurring process is performed on the main image at the time of coding, the image decoding apparatus 1100 makes it possible to properly remove the distortion from the blurred main image, and to display the main image as a clear 2D video on the display unit D1.

Although the image coding apparatus, the image coding system, and the image decoding apparatus according to an implementation of the present invention have been described as above using Embodiments 1 to 5 and their modifications, the present invention is not limited to these.

For instance, the image coding apparatus according to the implementation of the present invention does not need to include all of the elements shown in FIGS. 4, 8, 10, and 11. The image coding apparatus makes it possible to produce the advantageous effects of the present invention even if the image coding apparatus does not include any of the elements (or includes only the elements shown in FIG. 15 or 17).

Figure 15:
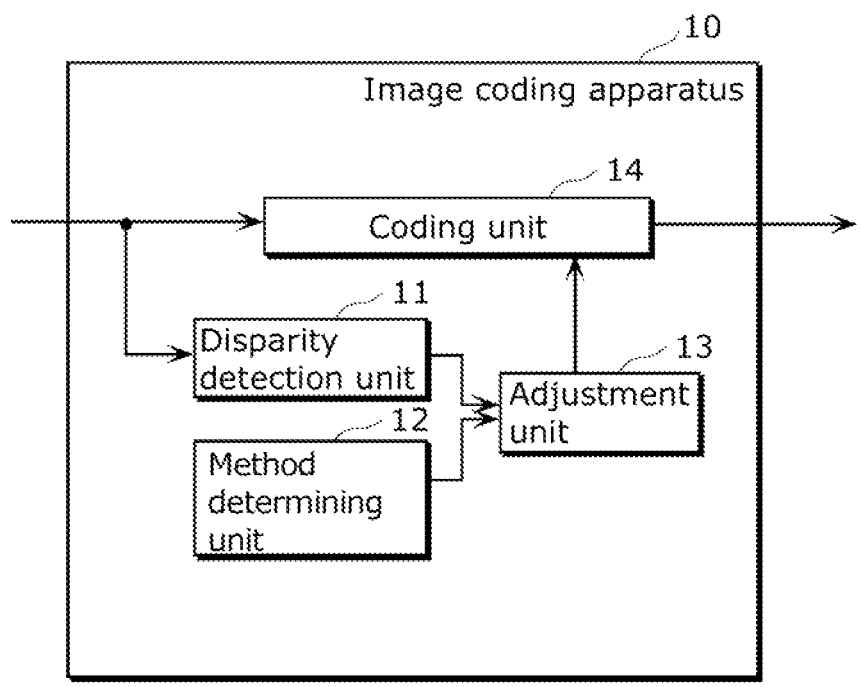
FIG. 15 is a block diagram showing a configuration of an image coding apparatus according to an implementation of the present invention.

FIG. 15 is a block diagram showing a configuration of an image coding apparatus according to the implementation of the present invention.

An image coding apparatus 10 according to the implementation of the present invention is an image coding apparatus which codes two images for three-dimensional viewing, and includes: a method determining unit 12 which determines a method of capturing the two images by two cameras Ca and Cb; a disparity detection unit 11 which detects, for each of areas making up the respective two images, a disparity between the two images; an adjustment unit 13 which determines, for each area, an adjustment amount for blurring an image, based on the image capturing method determined by the method determining unit 12 and the disparity detected for the area by the disparity detection unit 11; and a coding unit 14 which codes the two images so that an image of the area is blurred by the adjustment amount determined for the area. Here, the disparity detection unit 11 corresponds to the detection unit 305 in Embodiments 1 to 5 and their modifications. The method determining unit 12 corresponds to the angle of convergence adjustment unit 302 or the disparity distribution recognition unit 601 in Embodiments 1 to 5 and their modifications. The adjustment unit 13 corresponds to the coding adjustment units 303, 503, 602, and 702 in Embodiments 1 to 5 and their modifications. The coding unit 14 corresponds to the conversion unit 308, the quantization unit 309, and the variable length coding unit 310 in Embodiments 1 to 5 and their modifications.

Moreover, an image coding method according to the implementation of the present invention does not need to include all of the steps shown in FIGS. 6 and 7. The image coding method makes it possible to produce the advantageous effects of the present invention even if the image coding method does not include any of the steps (e.g. includes only steps shown in FIG. 16).

Figure 16:
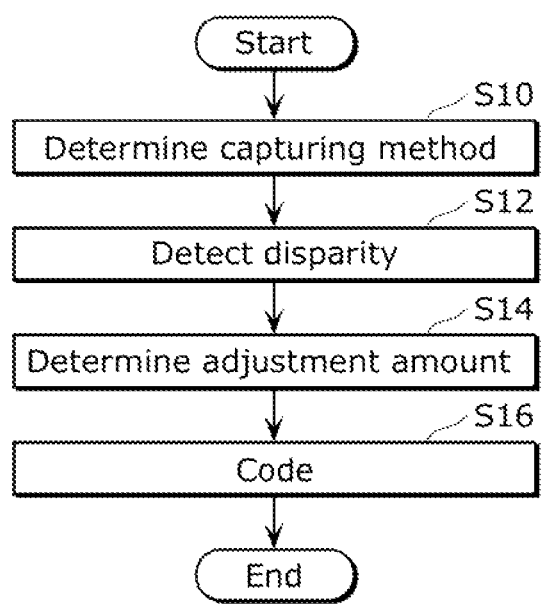
FIG. 16 is a flowchart showing operations of the image coding apparatus according to the implementation of the present invention.

FIG. 16 is a flowchart showing the image coding method according to the implementation of the present invention.

The image coding method according to the implementation of the present invention is an image coding method for coding two images for three-dimensional viewing, and includes: determining a method of capturing the two images by two cameras (step S10); detecting, for each of areas making up the respective two images, a disparity between the two images (step S12); determining, for each area, an adjustment amount for blurring an image, based on the determined image capturing method and the disparity detected for the area (step S14); and coding the two images so that an image of the area is blurred by the adjustment amount determined for the area (step S16). The coding by such an image coding method is performed by the image coding apparatus 10 shown in FIG. 15.

As described above, the image coding apparatus 10 and the image coding method according to the implementation of the present invention determine the adjustment amount based not only on the disparity but also on the image capturing method at the time of coding the two images (e.g. main image and sub image) for the three-dimensional viewing, and code the two images so that the image is blurred by the adjustment amount. Blurring the image as above makes it possible to reduce the fatigue of the viewer which is caused by the three-dimensional viewing. Furthermore, the adjustment amount is determined based not only on the disparity but also on the image capturing method, and thus it is possible to prevent the blurring process from being performed on the significant area due to the image capturing method. Thus, among the elements in Embodiments 1 to 5 and their modifications, elements other than the elements included in the image coding apparatus 10 are not essential. Moreover, the coding performed by the coding unit 14 (step S16) is not limited to the coding (orthogonal transformation, quantization, variable length coding, and so on) in Embodiments 1 to 5 or their modifications.

Figure 17:
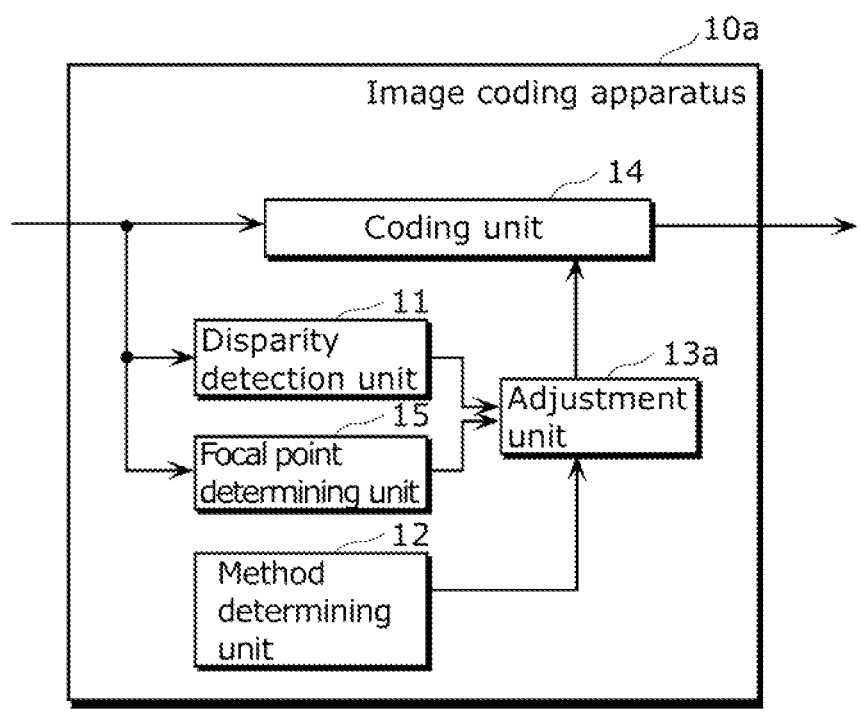
FIG. 17 is a block diagram showing another configuration of an image coding apparatus according to the implementation of the present invention.

FIG. 17 is a block diagram showing another configuration of the image coding apparatus according to the implementation of the present invention.

An image coding apparatus 10a according to the implementation of the present invention is an image coding apparatus which codes two images for three-dimensional viewing, and includes: a method determining unit 12 which determines a method of capturing the two images by two cameras Ca and Cb; a disparity detection unit 11 which detects, for each area making up the respective two images, a disparity between the two images; an adjustment unit 13a which determines, for each area, an adjustment amount for blurring an image, based on the image capturing method determined by the method determining unit 12 and the disparity detected for the area by the disparity detection unit 11; and a coding unit 14 which codes the two images so that an image of the area is blurred by the adjustment amount determined for the area. In addition, the image coding apparatus 10a further includes a focal point determining unit 15 which determines, among areas of the two images obtained by capturing with the two cameras, a focus area. The adjustment unit 13a sets, as the first or second threshold, a magnitude of a disparity which the disparity detection unit 11 has detected for the focus area determined by the focal point determining unit 15. Here, the focal point determining unit 15 corresponds to the focal point adjustment unit 402 in Embodiments 1 to 5 and their modifications.

Such an image coding apparatus 10a makes it possible to produce the same advantageous effects as the image coding apparatus 10. In addition, the disparity in the focus area is set as the first or second threshold, and thus the image coding apparatus 10a makes it possible to blur a distant image while clarifying the focus area, that is, enhancing the image quality of the focus area. Thus, among the elements in Embodiments 1 to 5 and their modifications, elements other than the elements included in the image coding apparatus 10a are not essential.

Moreover, although the image of the area in which the long-distance view (background) is shown is blurred in Embodiments 1 to 5 and their modifications, conversely, a large amount of information may be assigned to the focus area, and the image quality of the focus area may be enhanced. Furthermore, although the image of the area in which the long-distance view (background) is shown is blurred in Embodiments 1 to 5 and their modifications, for example, an image of an area in which a short-distance view having the capturing distance L shorter than the distance to the focal point is shown may be blurred, or the image of the area in which the long-distance view is shown and the image of the area in which the short-distance view is shown may be blurred together.

Moreover, although the adjustment amount corresponding to the magnitude of the disparity vector is determined in Embodiments 1 to 5 and their modifications, a fixed adjustment amount may be determined regardless of the magnitude of the disparity vector.

Furthermore, although the disparity compensation prediction coding is performed on the video signal (sub image) provided from the camera Cb in Embodiments 1 to 5 and their modifications, the disparity compensation prediction coding and the motion compensation prediction coding may be performed on the same. In other words, the image coding apparatus may use, as a multi-view profile (MVP), a compression coding method using both of the disparity compensation prediction and the motion compensation prediction.

Moreover, although the stereo capturing equipment 300A includes the two cameras (Ca and Cb) in Embodiments 1 to 5 and their modifications, the stereo capturing equipment 300A may include a single camera. In this case, the camera may include all of the functions and configurations of the cameras Ca and Cb, and include a single imaging element (e.g. CCD) for two optical devices (lenses). When the camera includes the single imaging element (e.g. CCD), the single imaging element receives light from each of the two optical devices, and converts the light into an electrical signal indicating a main image and another electrical signal indicating a sub image.

Furthermore, as shown in FIG. 5B, in the case of the parallel view method, the direction of the disparity vector is not changed from the positive to the negative as the capturing distance L increases in Embodiments 1 to 5 and their modifications. However, even in the parallel view method, the cameras (Ca and Cb) may be configured so that the direction of the disparity vector is changed as in the cross view method (as shown in FIG. 5A).

Figure 18A:
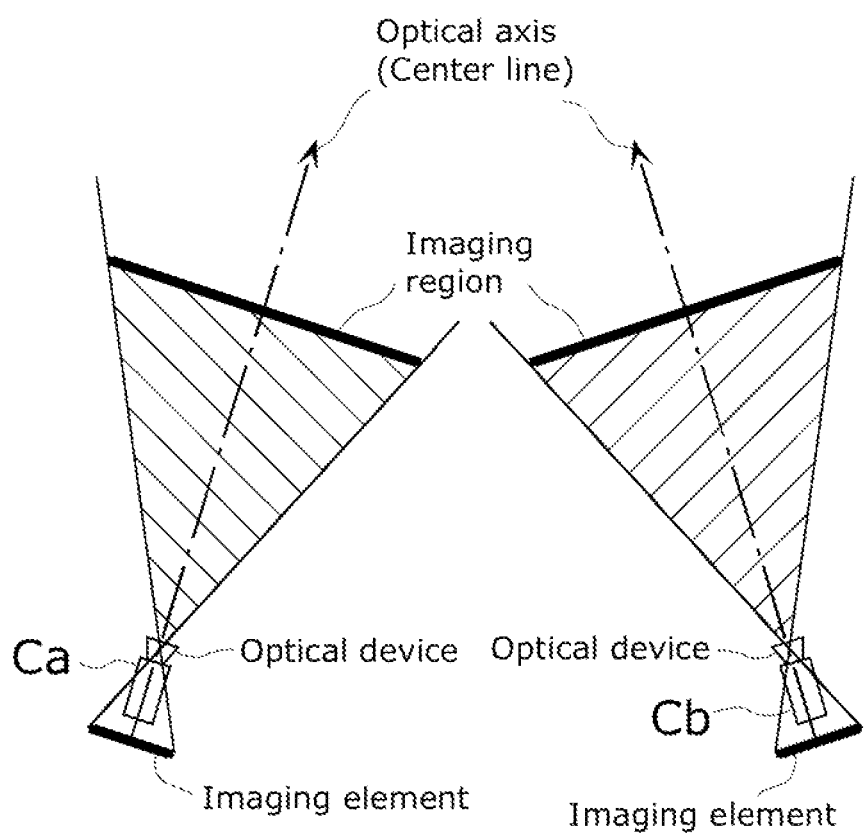
FIG. 18A is a diagram showing a configuration of a camera according to the implementation of the present invention.
Figure 18B:
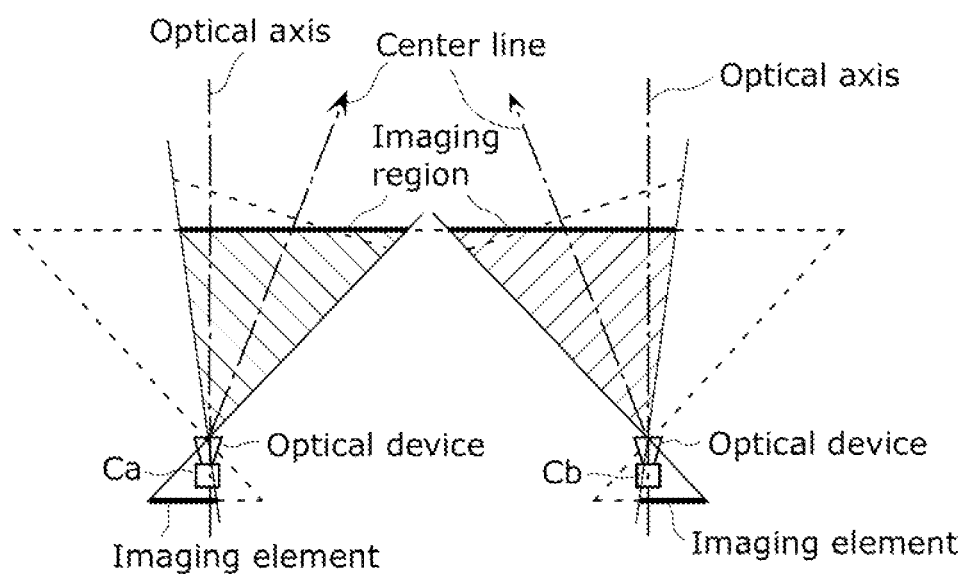
FIG. 18B is a diagram showing another configuration of a camera according to the implementation of the present invention.

Each of FIGS. 18A and 18B is a diagram for illustrating configurations of cameras.

As shown in FIG. 18A, in the case of the cross view method, optical axes of the cameras Ca and Cb (two optical devices) intersect with each other. Here, in each of the cameras Ca and Cb, the optical device and the imaging element corresponding to the optical device are placed along the optical axis. As a result, a center line extending from the optical device of the camera Ca to the center of an imaging area corresponding to a main image matches the optical axis of the optical device of the camera Ca. Likewise, a center line extending from the optical device of the camera Cb to the center of an imaging area corresponding to a sub image matches the optical axis of the optical device of the camera Cb. It is to be noted that each of the center lines shows a direction of capturing the main image or the sub image. Thus, when the two optical axes intersect with each other, the two center lines also intersect with each other. The intersection of the center lines changes the direction of the disparity vector according to the increase in the capturing distance L as shown in FIG. 5A.

On the other hand, when such cameras Ca and Cb are placed so that the optical axes of the cameras Ca and Cb are parallel to each other, image capturing using the parallel view method is performed. In this case, the center lines of the cameras Ca and Cb are parallel to each other. Thus, as shown in FIG. 5B, the direction of the disparity vector is not changed from the positive to the negative according to the increase in the capturing distance L.

However, as shown in FIG. 18B, even in the case of the parallel view method, like the cross view method, that is, as shown in FIG. 5A, there is a case where the direction of the disparity vector is changed from the positive to the negative according to the increase in the capturing distance L. In this case, in each of the cameras Ca and Cb, the imaging element is displaced from the optical axis. In other words, each of the cameras Ca and Cb is configured as a lens shift camera. Even if the optical axes of the cameras Ca and Cb are parallel to each other, the displacement of the imaging element causes the center lines of the cameras Ca and Cb to interest with each other. The intersection of the center lines changes the direction of the disparity vector according to the increase in the capturing distance L as shown in FIG. 5A.

Therefore, in Embodiments 1 to 5 and their modifications, the image coding apparatus may determine an image capturing method by using an angle between the center lines, and the coding adjustment unit may determine, for each block (area), an adjustment amount for blurring an image, based on the determined angle and a disparity detected for the block.

It is to be noted that although the lens shift cameras intersect the center lines with each other in the parallel view method in the above example, other configurations may intersect the center lines in the parallel view method. For instance, in each of two cameras of which optical axes are parallel to each other, an optical device and an imaging element corresponding to the optical device are placed along the optical axis, and a viewing angle of the optical device and a light-receiving area of the imaging element are set large. Thus, a part of an image generated by the imaging element (a part of an image generated by the other imaging element) is trimmed as a main image or a sub image. Just like the lens shift camera, even such two cameras make it possible to intersect the center lines with each other despite the parallel view method.

Moreover, although the method of capturing the two pictures (main image and sub image) by the cameras is determined in Embodiments 1 to 5 and their modifications, the image capturing method does not need to be determined. For example, when the image capturing method is the parallel view method, the two pictures are coded so that an image of each block (area) is blurred by an adjustment amount corresponding to a disparity between the two pictures, without determining the image capturing method. For instance, when a disparity is less than a threshold, the two pictures are coded so that the image of the block corresponding to the disparity is blurred, and the smaller a disparity is, the more strongly an image of a block corresponding to the disparity is blurred. Consequently, when the image capturing method is the parallel view method, it is possible to prevent the blurring process from being performed on the significant area.

Furthermore, a scope of the present invention includes the following cases.

(1) Each of the aforementioned apparatuses is specifically a computer system including a micro processing unit, a ROM, a RAM, a hard disk unit, and display unit, a keyboard, a mouse, and so on. A computer program is stored in the RAM and the hard disk unit. The micro processing unit operates according to the computer program, so that the respective apparatuses achieve their functions. Here, in order for the respective apparatuses to achieve their functions, the computer program is configured by combining a plurality of instruction codes indicating instructions for the computer.

(2) Part or all of the constituent elements constituting the respective apparatuses may be configured from a single system LSI (Large Scale Integration). The system LSI is a super-multifunctional LSI manufactured by integrating constituent units on one chip, and is specifically a computer system configured by including a micro processing unit, a ROM, a RAM, and so on. A computer program is stored in the RAM. The micro processing unit operates according to the computer program, so that the system LSI achieves its functions.

Moreover, each unit of the constituent elements constituting the respective apparatuses may be configured as a separate chip or a single chip to include part or all thereof.

Furthermore, here, the system LSI is mentioned but there are instances where, due to a difference in the degree of integration, the designations IC, LSI, super LSI, and ultra LSI may be used. Moreover, the means for circuit integration is not limited to an LSI, and implementation with a dedicated circuit or a general-purpose processor is also possible. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears through progress in semiconductor technology or other derived technology, that technology can naturally be used to carry out integration of the constituent elements. Biotechnology is anticipated to apply.

(3) Part or all of the constituent elements constituting the respective apparatuses may be configured as an IC detachable from the respective apparatuses or as a stand-alone module. The IC card or the module is a computer system including a micro processing unit, a ROM, a RAM, and so on. The IC card or the module may include the super-multifunctional LSI. The micro processing unit operates according to a computer program, so that the IC card or the module achieves its functions. The IC card or the module may have tamper-resistance.

(4) The present invention may be the aforementioned method. In addition, the present invention may be a computer program causing a computer to execute the method, or a digital signal including the computer program.

Moreover, the present invention may be realized by storing the computer program or the digital signal in a computer-readable recording medium such as a flexible disk, a hard disk, a CD-ROM, an MO, a DVD, a DVD-ROM, a DVD-RAM, a BD (Blu-ray Disc), and a semiconductor memory. Furthermore, the present invention may be the digital signal stored in these recording media.

Moreover, the present invention may be realized by transmitting the computer program or the digital signal via a telecommunication line, a wireless or wired communication line, a network represented by the Internet, a data broad cast, and so on.

Furthermore, the present invention may be a computer system including a micro processing unit and a memory. The memory may store the computer program, and the micro processing unit may operate according to the computer program.

Moreover, the present invention may be another independent computer system which executes the computer program or the digital signal that is stored in the recording medium and transferred thereto or is transferred thereto via the network and so on.

(5) The present invention may be realized by combining the embodiments and the modifications.

The image coding apparatus according to the implementation of the present invention produces an advantageous effect of coding an easily viewable three-dimensional video by blurring a background area and assigning information to a focus area regardless of an image capturing method for a three-dimensional video, at the time of coding two video signals to generate a three-dimensional video, and is useful as a digital video camera, a digital still camera, and so on.

REFERENCE SIGNS LIST 10, 300, 500, 600, 700 Image coding apparatus
11 Disparity detection unit
12 Method determining unit
13 Adjustment unit
14 Coding unit
302 Angle of convergence adjustment unit
303, 503, 602, 702 Coding adjustment unit
304 Selector
305 Detection unit
306 Subtractor
307, 314, 1008, 1009 Switch
308 Conversion unit
309 Quantization unit
310 Variable length coding unit
311 Inverse quantization unit
312 Inverse conversion unit
313, 1004 Adder
316 Compensation unit
402 Focal point adjustment unit
601 Disparity distribution recognition unit
800 Image coding system
801 Image coding unit
804 Display unit
805 External recording device
1000, 1100 Image decoding apparatus
1001 Variable length decoding unit
1002 Inverse quantization/inverse conversion unit
1003 Motion/disparity compensation unit
1005, 1010 Deblocking filter
1006, 1011 Filter process determination unit
1007 Edge enhancement unit
Ca, Cb Camera
D1 Display unit
Me, Me1 Storage unit

The invention claimed is:

1. An image coding apparatus which codes two images for three-dimensional viewing, the image coding apparatus comprising:
a processor; and
a non-transitory memory storing thereon a program, which when executed by the processor, causes the processor to execute instructions including:
determining whether a method of capturing the two images by two cameras, respectively, is a parallel view method or a cross view method;
detecting, for each of areas making up the respective two images, a disparity between the two images;
when it is determined that the method of capturing is the cross view method, determining, for each of the areas, whether the disparity detected for the area is greater than a first threshold, and determining, for each of the areas, an adjustment amount for blurring an image, the adjustment amount for the area having (i) when the disparity for the area is determined to be greater than the first threshold, a degree of blurring that is greater as the disparity detected for the area is greater and (ii) when the disparity for the area is not determined to be greater than the first threshold, a degree of blurring of 0;
when it is determined that the method of capturing is the parallel view method, determining, for each of the areas, whether the disparity detected for the area is less than a second threshold, and determining, for each of the areas, an adjustment amount for blurring an image, the adjustment amount for the area having (i) when the disparity for the area is determined to be less than the second threshold, a degree of blurring that is greater as the disparity detected for the area is less and (ii) when the disparity for the area is not determined to be less than the second threshold, a degree of blurring of 0; and
coding, for each of the areas, the two images so that an image of the area is blurred by the adjustment amount determined for the area.

2. The image coding apparatus according to claim 1, wherein the program further causes the processor to execute instructions including:

determining a focus area of each of the two images captured by the two cameras; and setting, as the first threshold, a magnitude of the disparity detected for each of the areas determined in said determining the focus area.

3. The image coding apparatus according to claim 1,
wherein the program further causes the processor to execute instructions including:
determining a focus area of each of the two images captured by the two cameras; and
setting, as the second threshold, a magnitude of the disparity detected for each of the areas determined in said determining the focus area.

4. The image coding apparatus according to claim 1,
wherein the program further causes the processor to execute instructions including
(i) determining, as an angle of convergence, an angle at which two optical axes of the two cameras for generating the two images intersect with each other, (ii) determining whether or not the angle of convergence is less than a predetermined angle, (iii) determining that the image capturing method is the cross view method when it is determined that the angle of convergence is not less than the predetermined angle, and (iv) determining that the image capturing method is the parallel view method when it is determined that the angle of convergence is less than the predetermined angle.

5. The image coding apparatus according to claim 1,
wherein the program further causes the processor to execute instructions including:
wherein said detecting includes detecting, for each of the areas, the disparity between the two images as a disparity vector; and
wherein said determining the method of capturing includes (i) determining whether or not a disparity vector having a negative direction and a disparity vector having a positive direction coexist in a distribution of the disparity vectors detected by the disparity detection unit for the areas, (ii) determining that the image capturing method is the cross view method when it is determined that the disparity vector having the negative direction and the disparity having the positive direction coexist, and (iii) determining that the image capturing method is the parallel view method when it is determined that the disparity vector having the negative direction and the disparity having the positive direction do not coexist.

6. The image coding apparatus according to claim 1,
wherein said coding includes:
performing, for each of the areas, orthogonal transformation on each of the two images; and
quantizing, for each of the areas, a frequency coefficient obtained through the orthogonal transformation performed by the conversion unit, and when a frequency coefficient of one of the areas is quantized, (i) increasing a quantization step by the adjustment amount determined for the area, and (ii) blurring an image of the area by quantizing the frequency coefficient of the area using the increased quantization step.

7. The image coding apparatus according to claim 1,
wherein said coding includes performing, for each of the areas, orthogonal transformation on each of the two images, and when frequency coefficients are generated for the one of the areas, blurring an image of the area by rounding down, among the frequency coefficients included in the area, a frequency coefficient in a high frequency domain having an extent corresponding to the adjustment amount determined by the adjustment unit for the area.

8. The image coding apparatus according to claim 1,
wherein said coding includes generating a predictive image by predicting one of the two images from the other of the two images, using the disparity detected for each of the areas, and coding the one image by calculating a difference between the one image and the predictive image.

9. The image coding apparatus according to claim 1,
wherein said determining the method of capturing includes determining, as the image capturing method, an angle between lines each of which shows a direction of capturing one of the two images, and
the program further causes the processor to execute instructions including
determining, for each of the areas, an adjustment amount for blurring an image, based on the determined angle and the disparity detected for the area.

10. An image coding system comprising:
two cameras;
the image coding apparatus according to claim 1, which codes, for three-dimensional viewing, two images captured by the two cameras, respectively; and
a recording medium for recording a signal generated through the coding performed by the image coding apparatus.

11. An image coding method for coding two images for three-dimensional viewing, the image coding method comprising:
determining whether a method of capturing the two images by two cameras, respectively, is a parallel view method or a cross view method;
detecting, for each of areas making up the respective two images, a disparity between the two images;
when it is determined that the method of capturing is the cross view method, determining, for each of the areas, whether the disparity detected for the area is greater than a first threshold, and determining, for each of the areas, an adjustment amount for blurring an image, the adjustment amount for the area having (i) when the disparity for the area is determined to be greater than the first threshold, a degree of blurring that is greater as the disparity detected for the area is greater and (ii) when the disparity for the area is not determined to be greater than the first threshold, a degree of blurring of 0;
when it is determined that the method of capturing is the parallel view method, determining, for each of the areas, whether the disparity detected for the area is less than a second threshold, and determining, for each of the areas, an adjustment amount for blurring an image, the adjustment amount for the area having (i) when the disparity for the area is determined to be less than the second threshold, a degree of blurring that is greater as the disparity detected for the area is less and (ii) when the disparity for the area is not determined to be less than the second threshold, a degree of blurring of 0; and
coding, for each of the areas, the two images so that an image of the area is blurred by the adjustment amount determined for the area.

12. A non-transitory computer-readable recording medium for use in a computer, the recording medium having a program for coding two images for three-dimensional viewing recorded thereon for causing the computer to execute steps comprising:

determining whether a method of capturing the two images by two cameras, respectively, is a parallel view method or a cross view method;

detecting, for each of areas making up the respective two images, a disparity between the two images;

when it is determined that the method of capturing is the cross view method, determining, for each of the areas, whether the disparity detected for the area is greater than a first threshold, and determining, for each of the areas, an adjustment amount for blurring an image, the adjustment amount for the area having (i) when the disparity for the area is determined to be greater than the first threshold, a degree of blurring that is greater as the disparity detected for the area is greater and (ii) when the disparity for the area is not determined to be greater than the first threshold, a degree of blurring of 0;

when it is determined that the method of capturing is the parallel view method, determining, for each of the areas, whether the disparity detected for the area is less than a second threshold, and determining, for each of the areas, an adjustment amount for blurring an image, the adjustment amount for the area having (i) when the disparity for the area is determined to be less than the second threshold, a degree of blurring that is greater as the disparity detected for the area is less and (ii) when the disparity for the area is not determined to be less than the second threshold, a degree of blurring of 0; and coding, for each of the areas, the two images so that an image of the area is blurred by the adjustment amount determined for the area.

13. A integrated circuit which codes two images for three-dimensional viewing, the integrated circuit comprising:

a processor; and a non-transitory memory storing thereon a program, which when executed by the processor, causes the processor to execute instructions including:

determining whether a method of capturing the two images by two cameras, respectively, is a parallel view method or a cross view method;

detecting, for each of areas making up the respective two images, a disparity between the two images;

when it is determined that the method of capturing is the cross view method, determining, for each of the areas, whether the disparity detected for the area is greater than a first threshold, and determining, for each of the areas, an adjustment amount for blurring an image, the adjustment amount for the area having (i) when the disparity for the area is determined to be greater than the first threshold, a degree of blurring that is greater as the disparity detected for the area is greater and (ii) when the disparity for the area is not determined to be greater than the first threshold, a degree of blurring of 0;

when it is determined that the method of capturing is the parallel view method, determining, for each of the areas, whether the disparity detected for the area is less than a second threshold, and determining, for each of the areas, an adjustment amount for blurring an image, the adjustment amount for the area having (i) when the disparity for the area is determined to be less than the second threshold, a degree of blurring that is greater as the disparity detected for the area is less and (ii) when the disparity for the area is not determined to be less than the second threshold, a degree of blurring of 0; and coding, for each of the areas, the two images so that an image of the area is blurred by the adjustment amount determined for the area.

* * * * *